United States Patent
Oh et al.

(10) Patent No.: US 12,513,503 B2
(45) Date of Patent: Dec. 30, 2025

(54) ELECTRONIC DEVICE SHARING PERIPHERAL DEVICE WITH EXTERNAL ELECTRONIC DEVICE REGISTERED TO SAME USER ACCOUNT AND METHOD THEREOF

(71) Applicant: Samsung Electronics Co., Ltd., Gyeonggi-do (KR)

(72) Inventors: Haewook Oh, Gyeonggi-do (KR); Doosuk Kang, Gyeonggi-do (KR); Yongju Kim, Gyeonggi-do (KR); Youngmin Yoo, Gyeonggi-do (KR); Seongjun Lee, Gyeonggi-do (KR); Buseop Jung, Gyeonggi-do (KR); Kunyoung Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/538,139

(22) Filed: Dec. 13, 2023

(65) Prior Publication Data

US 2024/0129705 A1    Apr. 18, 2024

Related U.S. Application Data

(63) Continuation of application No. 18/091,508, filed on Dec. 30, 2022, now Pat. No. 11,889,581, which is a
(Continued)

(30) Foreign Application Priority Data

Oct. 28, 2019    (KR) .................. 10-2019-0134931

(51) Int. Cl.
*H04W 8/00* (2009.01)
*G06F 3/01* (2006.01)
(Continued)

(52) U.S. Cl.
CPC ............ *H04W 8/005* (2013.01); *G06F 3/017* (2013.01); *G06F 3/04162* (2019.05);
(Continued)

(58) Field of Classification Search
CPC ....... H04W 8/005; H04W 4/80; H04W 88/06; G06F 3/017; G06F 3/04162;
(Continued)

(56) References Cited

U.S. PATENT DOCUMENTS

| 8,122,162 B2 | 2/2012 | Kweon et al. |
| 9,591,554 B2 | 3/2017 | Baron et al. |

(Continued)

FOREIGN PATENT DOCUMENTS

| CN | 101089808 | 12/2007 |
| CN | 103500019 | 1/2014 |

(Continued)

OTHER PUBLICATIONS

International Search Report dated Dec. 30, 2020 Issued in counterpart application No. PCT/KR2020/012404, 11 pages.
(Continued)

*Primary Examiner* — David D Davis
(74) *Attorney, Agent, or Firm* — The Farrell Law Firm, P.C.

(57) ABSTRACT

An electronic device is provided, which receives a user input from a peripheral device, transmits a request associated with a share function for the peripheral device to at least one external electronic device near the electronic device, receives a response to the request from the at least one external electronic device, determines whether the at least one external electronic device is registered to a same user account, determines whether the share function for the peripheral device is allowed at the at least one external electronic device, and if the at least one external electronic
(Continued)

device is registered to the same user account and the share function is allowed at the at least one external electronic device, and based on a determination that the user input corresponds to a location of a cursor being out of the display screen, transmits input information associated with the user input from the peripheral device to the at least one external electronic device, such that the cursor is displayed at the at least one external electronic device.

20 Claims, 23 Drawing Sheets

Related U.S. Application Data continuation of application No. 17/027,043, filed on Sep. 21, 2020, now Pat. No. 11,546,748.

(51) Int. Cl.
  *G06F 3/041* (2006.01)
  *G06F 3/0482* (2013.01)
  *H04L 69/18* (2022.01)
  *H04W 4/80* (2018.01)

(52) U.S. Cl.
  CPC ............ *G06F 3/0482* (2013.01); *H04L 69/18* (2013.01); *H04W 4/80* (2018.02)

(58) Field of Classification Search
  CPC .... G06F 3/0482; G06F 1/1607; G06F 1/1626; G06F 1/1698; G06F 1/3209; G06F 1/3215; G06F 1/3278; G06F 1/3287; G06F 3/0346; G06F 3/03545; G06F 3/04847; G06F 3/0488; G06F 3/038; H04L 69/18; H04L 67/51; Y02D 10/00; H04M 1/72412
  See application file for complete search history.

(56) References Cited

U.S. PATENT DOCUMENTS

| | | | |
|---|---|---|---|
| 9,913,079 | B2 | 3/2018 | Srivatsa et al. |
| 10,080,182 | B2 | 9/2018 | Kim et al. |
| 10,111,161 | B2 | 10/2018 | Jung et al. |
| 10,243,786 | B2 | 3/2019 | Rjeili et al. |
| 10,257,873 | B2 | 4/2019 | Jung et al. |
| 10,277,671 | B2 | 4/2019 | Passeri et al. |
| 10,289,268 | B2 | 5/2019 | Jung et al. |
| 10,291,465 | B2 | 5/2019 | Rjeili et al. |
| 10,397,970 | B2 | 8/2019 | Kurian et al. |
| 10,419,912 | B2 | 9/2019 | Srivatsa et al. |
| 10,506,504 | B2 | 12/2019 | Jung et al. |
| 10,524,100 | B2 | 12/2019 | Ko et al. |
| 10,530,820 | B2 | 1/2020 | Van De Laar et al. |
| 10,560,971 | B2 | 2/2020 | Seo et al. |
| 10,635,391 | B2 | 4/2020 | Shin et al. |
| 10,681,524 | B2 | 6/2020 | Kawakami et al. |
| 10,686,655 | B2 | 6/2020 | Rjeili et al. |
| 10,742,730 | B2 | 8/2020 | Passeri et al. |
| 10,939,281 | B2 | 3/2021 | Ko et al. |
| 10,979,931 | B2 | 4/2021 | Choi et al. |
| 10,986,482 | B2 | 4/2021 | Srivatsa et al. |
| 11,005,937 | B2 | 5/2021 | Dowlatkhah et al. |
| 11,051,147 | B2 | 6/2021 | Ko et al. |
| 11,159,932 | B1 * | 10/2021 | Meyer ..................... G06F 3/016 |
| 11,546,748 | B2 | 1/2023 | Oh et al. |
| 11,849,378 | B2 | 12/2023 | Mangalam Srivatsa et al. |
| 2006/0133414 | A1 | 6/2006 | Luoma et al. |
| 2009/0177810 | A1 | 7/2009 | Kweon et al. |
| 2009/0251413 | A1 | 10/2009 | Winchester |
| 2014/0003409 | A1 | 1/2014 | Van De Laar et al. |
| 2014/0080469 | A1 * | 3/2014 | Ko ........................ H04W 8/22 455/418 |
| 2014/0325402 | A1 | 10/2014 | Jung et al. |
| 2015/0222738 | A1 | 8/2015 | Sood et al. |
| 2016/0021683 | A1 | 1/2016 | Sood et al. |
| 2016/0029149 | A1 | 1/2016 | Morikawa et al. |
| 2016/0286388 | A1 | 9/2016 | Marin et al. |
| 2016/0323456 | A1 | 11/2016 | Bernsen et al. |
| 2016/0334837 | A1 | 11/2016 | Dees et al. |
| 2017/0034769 | A1 | 2/2017 | Kim et al. |
| 2017/0055305 | A1 | 2/2017 | Kurian et al. |
| 2017/0289277 | A1 | 10/2017 | Lee et al. |
| 2017/0351629 | A1 | 12/2017 | Passeri et al. |
| 2019/0037020 | A1 | 1/2019 | Dowlatkhah et al. |
| 2019/0069149 | A1 | 2/2019 | Park et al. |
| 2019/0159000 | A1 | 5/2019 | Ilami et al. |
| 2019/0243517 | A1 | 8/2019 | Jung et al. |
| 2019/0265938 | A1 | 8/2019 | Kim et al. |
| 2019/0303088 | A1 | 10/2019 | Yuan |
| 2020/0128620 | A1 | 4/2020 | Han et al. |

FOREIGN PATENT DOCUMENTS

| | | | | |
|---|---|---|---|---|
| CN | 105378768 | | 3/2016 | |
| CN | 105594236 | | 5/2016 | |
| CN | 106060234 | | 10/2016 | |
| CN | 106605417 | | 4/2017 | |
| CN | 107153520 | | 9/2017 | |
| CN | 107463281 | | 12/2017 | |
| CN | 107683602 | | 2/2018 | |
| CN | 108476533 | | 8/2018 | |
| CN | 108605373 | | 9/2018 | |
| CN | 108632858 | | 10/2018 | |
| EP | 1612999 | A1 * | 1/2006 | ......... H04N 21/4126 |
| KR | 10-2010-0118328 | | 11/2010 | |
| KR | 1020140032768 | | 3/2014 | |
| KR | 10-2014-0128207 | | 11/2014 | |
| KR | 10-2016-0062543 | | 6/2016 | |
| KR | 1020160138979 | | 12/2016 | |
| KR | 1020170033025 | | 3/2017 | |
| KR | 1020180092137 | | 8/2018 | |
| WO | WO-2014207288 | A1 * | 12/2014 | ........... G06F 3/0486 |
| WO | WO 2015/092970 | | 6/2015 | |

OTHER PUBLICATIONS

European Search Report dated Jul. 18, 2022 issued in counterpart application No. 20882577.8-1213, 10 pages.
European Search Report dated Jul. 18, 2023 issued in counterpart application No. 20882577.8-1213, 7 pages.
Chinese Office Action dated May 6, 2024 issued in counterpart application No. 202080075569.8, 26 pages.
Korean Office Action dated Feb. 14, 2024 issued in counterpart application No. 10-2019-0134931, 21 pages.
Chinese Office Action dated Oct. 31, 2024 issued in counterpart application No. 202080075569.8, 21 pages.
Korean Office Action dated Sep. 27, 2024 issued in counterpart application No. 10-2019-0134931, 11 pages.
European Search Report dated Nov. 25, 2024 issued in counterpart application No. 24202675.5-1206, 10 pages.
U.S. Office Action dated Dec. 13, 2024 issued in counterpart U.S. Appl. No. 18/427,158, 38 pages.
Chinese Office Action dated Feb. 28, 2025 issued in counterpart application No. 202080075569.8, 25 pages.
U.S. Final Action dated Jun. 17, 2025 issued in counterpart U.S. Appl. No. 18/427,158, 30 pages.
CN Rejection Decision dated May 30, 2025 issued in counterpart application No. 202080075569.8, 22 pages.
U.S. Office Action dated Sep. 15, 2025 issued in counterpart U.S. Appl. No. 18/427,158, 29 pages.
European Search Report dated Sep. 17, 2025 issued in counterpart application No. 24202675.5-1218, 5 pages.

* cited by examiner

ELECTRONIC DEVICE SHARING PERIPHERAL DEVICE WITH EXTERNAL ELECTRONIC DEVICE REGISTERED TO SAME USER ACCOUNT AND METHOD THEREOF

CROSS-REFERENCE TO RELATED APPLICATION(S)

This application is a continuation of U.S. patent application Ser. No. 18/091,508, filed in the U.S. Patent and Trademark Office on Dec. 30, 2022, which is a continuation of U.S. patent application Ser. No. 17/027,043, which was filed in the U.S. Patent and Trademark Office on Sep. 21, 2020, and issued as U.S. Pat. No. 11,546,748, on Jan. 3, 2023, and is based on and claims priority under 35 U.S.C. § 119 to Korean Patent Application No. 10-2019-0134931, which was filed in the Korean Intellectual Property Office on Oct. 28, 2019, the disclosure of each of which is incorporated by reference herein in their entireties.

BACKGROUND

1. Field

The disclosure relates generally to an electronic device capable of sharing a peripheral device with an external electronic device and a method thereof, and more particularly, to a technology for allowing an external electronic device to use a peripheral device connected with an electronic device as a peripheral device of the external electronic device.

2. Description of Related Art

Technologies for performing wireless communication between a plurality of devices by using various kinds of short-range communication are being developed and used. Bluetooth™ low energy (BLE) communication, being one of short-range wireless communication schemes, may transmit/receive data with a low power and thus may operate a device performing the BLE communication for a long time even with a low capacity battery.

Wi-Fi Aware™ is another wireless communication technology. Wi-Fi Aware™ may be used for beacon communication in which a short message is repeatedly sent.

It may be possible to use a peripheral device of an electronic device through a wireless connection using the short-range wireless communication. For example, it may be possible to use a peripheral device, such as a wireless keyboard, a wireless mouse, or an electronic pen, as an input device through a wireless connection with an electronic device.

In the case of connecting and using a peripheral device, which is connected with an electronic device through the short-range wireless communication, with another electronic device, a process of releasing the short-range wireless communication connection between the peripheral device and the electronic device and again performing the short-range wireless communication connection with a different electronic device may be required. Also, the same operation may be repeated again to connect the peripheral device with the electronic device after the peripheral device is connected with the other electronic device.

In this case, because a user of the electronic device may have to perform repetitive operations to change a device connected with the peripheral device of the electronic device through the short-range wireless communication, a user of the electronic device may be inconvenienced. Thus, a device and method for allowing any other device to easily use the peripheral device connected with the electronic device would be advantageous.

SUMMARY

The present disclosure has been made to address the above-mentioned problems and disadvantages, and to provide at least the advantages described below.

In accordance with an aspect of the disclosure, an electronic device includes a display screen, at least one wireless communication circuit, a memory storing instructions, and at least one processor. The instructions, when executed by the at least one processor, cause the electronic device to receive a user input from a peripheral device through a first connection between the electronic device and the peripheral device, transmit a request associated with a share function for the peripheral device to at least one external electronic device near the electronic device, receive a response to the request from the at least one external electronic device, determine whether the at least one external electronic device is registered to a same user account as the electronic device, and determine whether the share function for the peripheral device is allowed at the at least one external electronic device. The instructions, when executed by the at least one processor, cause the electronic device to, in case that the at least one external electronic device is registered to a same user account as the electronic device and the share function for the peripheral device is allowed at the at least one external electronic device, based on a determination that the user input corresponds to a location of a cursor being out of the display screen, transmit input information associated with the user input from the peripheral device to the at least one external electronic device through a second connection between the electronic device and the at least one external electronic device such that the cursor is caused to be displayed at the at least one external electronic device based on the transmitted input information.

In accordance with another aspect of the disclosure, a method of an electronic device includes receiving a user input from a peripheral device through a first connection between the electronic device and the peripheral device, transmitting a request associated with a share function for the peripheral device to at least one external electronic device near the electronic device, receiving a response to the request from the at least one external electronic device, determining whether the at least one external electronic device is registered to a same user account as the electronic device, and determining whether the share function for the peripheral device is allowed at the at least one external electronic device. The method further comprises, in case that the at least one external electronic device is registered to a same user account as the electronic device and the share function for the peripheral device is allowed at the at least one external electronic device, based on a determination that the user input corresponds to a location of a cursor being out of a display screen of the electronic device, transmitting input information associated with the user input from the peripheral device to the at least one external electronic device through a second connection between the electronic device and the at least one external electronic device such that the cursor is caused to be displayed at the at least one external electronic device based on the transmitted input information.

In accordance with another aspect of the disclosure, a non-transitory computer-readable storage medium is disclosed. The non-transitory computer-readable storage medium having stored thereon instructions that, when executed by the at least one processor of an electronic device, cause the electronic device to receive a user input from a peripheral device through a first connection between the electronic device and the peripheral device, transmit a request associated with a share function for the peripheral device to at least one external electronic device near the electronic device, receive a response to the request from the at least one external electronic device, determine whether the at least one external electronic device is registered to a same user account as the electronic device, and determine whether the share function for the peripheral device is allowed at the at least one external electronic device. The instructions, when executed by the at least one processor of an electronic device, cause the electronic device to, in case that the at least one external electronic device is registered to a same user account as the electronic device and the share function for the peripheral device is allowed at the at least one external electronic device, based on a determination that the user input corresponds to a location of a cursor being out of a display screen of the electronic device, transmit input information associated with the user input from the peripheral device to the at least one external electronic device through a second connection between the electronic device and the at least one external electronic device such that the cursor is caused to be displayed at the at least one external electronic device based on the transmitted input information.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
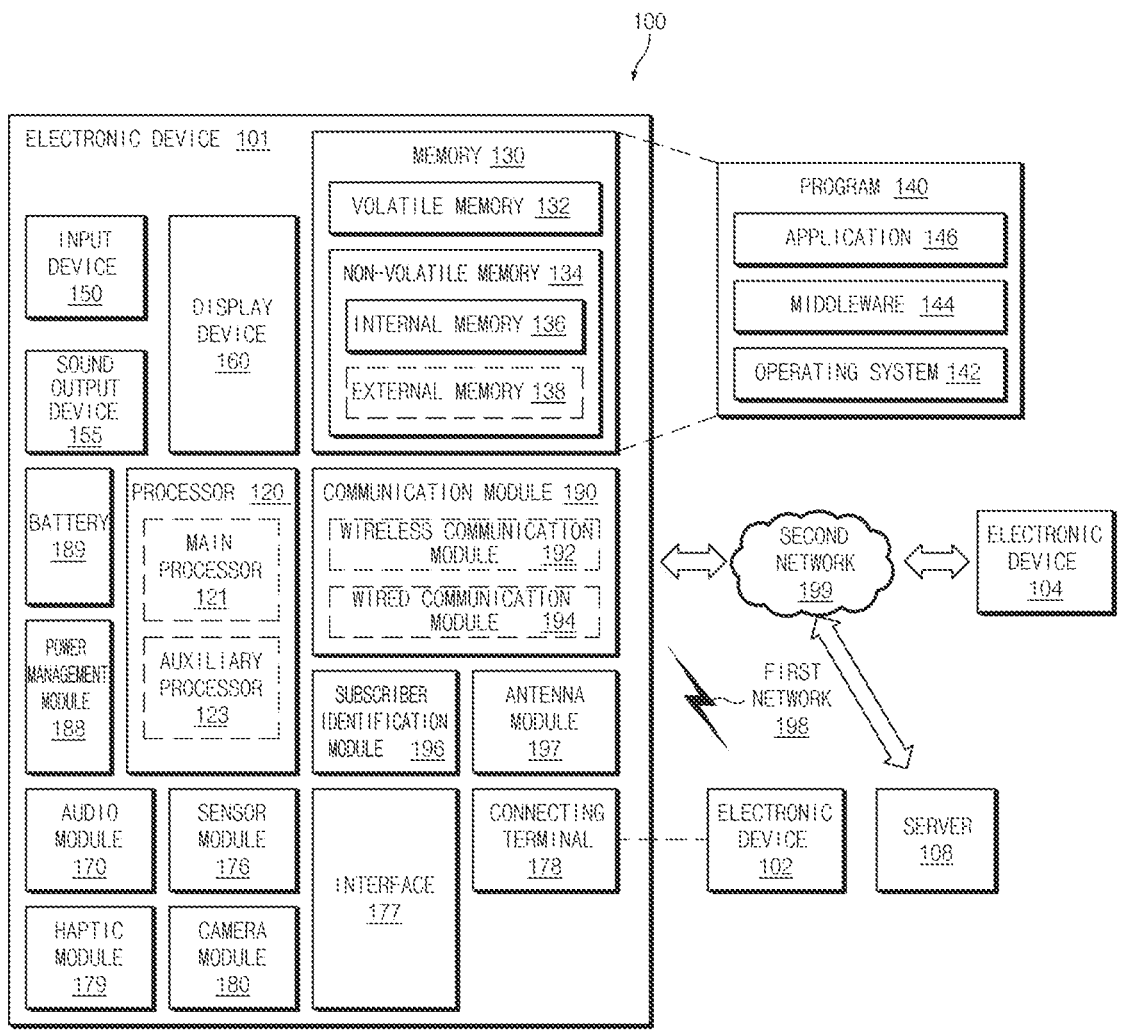
FIG. 1 is a block diagram illustrating an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to an embodiment, the memory 130 may store instructions necessary for the electronic device 101 to operate. The processor 120 may execute the instructions stored in the memory 130 to process data or to control a component of the electronic device 101. In the specification, an operation of the electronic device 101 may be understood as the processor 120 executes the instructions stored in the memory 130 to perform the operation of the electronic device 101.

Figure 2:
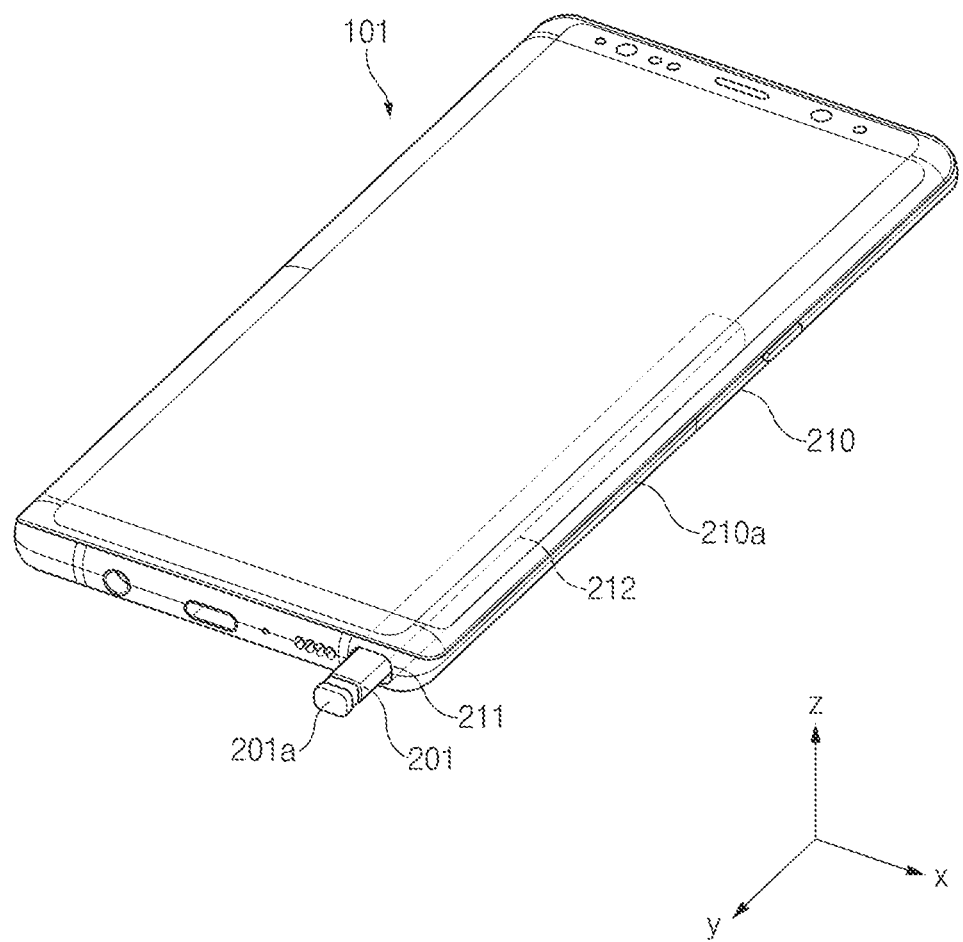
FIG. 2 is a perspective view of an electronic device including a removable electronic pen, according to an embodiment.

FIG. 2 is a perspective view of the electronic device 101 including a stylus pen 201, according to an embodiment. The stylus pen 201 may correspond to the input device 150 of FIG. 1.

The electronic device 101 in FIG. 2 may include the components illustrated in FIG. 1 and may include a structure where the stylus pen 201 is capable of being inserted.

Referring to FIG. 2, the electronic device 101 includes a housing 210, and a hole 211 at a portion of the housing 210, for example, at a portion of a side surface 210*a*. The electronic device 101 includes a first inner space 212 being a receiving space connected with the hole 211, and the stylus pen 201 may be inserted into the first receiving space 212. According to the embodiment that is illustrated, the stylus pen 201 includes a first button 201*a* capable of being pressed at one end portion thereof so as to make it easy to pull out the stylus pen 201 from the first receiving space 212 of the electronic device 101. When the first button 201*a* is pressed, a repulsive mechanism (e.g., a mechanism that is repulsed by at least one elastic member (e.g., a spring)) connected with the first button 201*a* may be initiated, and the stylus pen 201 may be detached from the first receiving space 212.

Figure 3A:
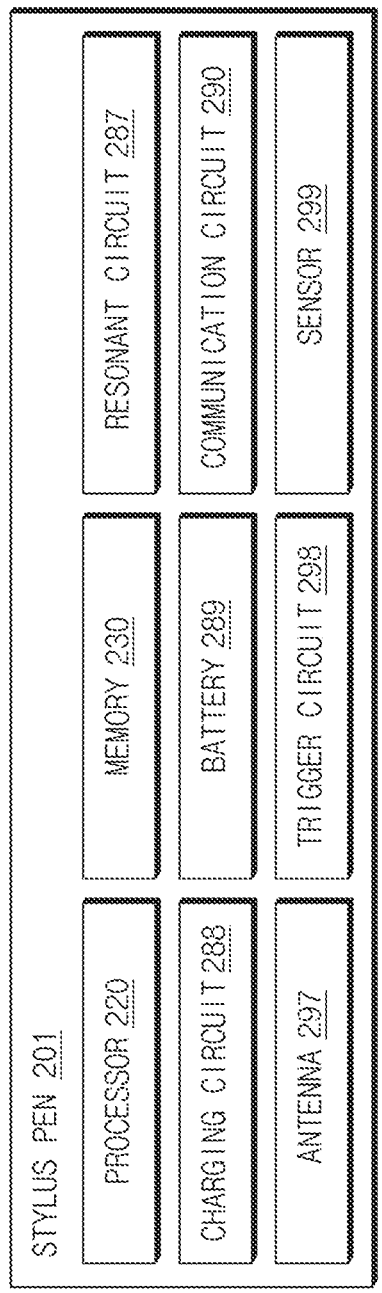
FIG. 3A is a block diagram illustrating a stylus pen, according to an embodiment.

FIG. 3A is a block diagram illustrating a stylus pen 201, according to an embodiment.

Referring to FIG. 3A, the stylus pen 201 includes a processor 220, a memory 230, a resonant circuit 287, a charging circuit 288, a battery 289, a communication circuit 290, an antenna 297, a trigger circuit 298, and/or a sensor 299. In the stylus pen 201, the processor 220, at least a part of the resonant circuit 287, and/or at least a part of the communication circuit 290 may be implemented on a PCB or may be implemented in the form of a chip. The processor 220, the resonant circuit 287, and/or the communication circuit 290 may be electrically connected with the memory 230, the charging circuit 288, the battery 289, the antenna 297, the trigger circuit 298, and/or the sensor 299. However, FIG. 3A is for describing embodiments implementing the stylus pen 201, and a configuration of the stylus pen 201 may be implemented to be different from the configuration illustrated in FIG. 3A.

The processor 220 may include a customized hardware module, or a generic processor configured to execute software (e.g., an application program). The processor 220 may include a hardware component (a function) or a software component (a program) including at least one of various sensors included in the stylus pen 201, a data measurement module, an input/output interface, a module to manage a state or an environment of the stylus pen 201, or a communication module. The processor 220 may include, for example, one of hardware, software, or firmware or a combination of two or more thereof. The processor 220 may be configured to transmit information indicating a press state of a button 337, sensing information obtained by the sensor 299, and/or information about a location of the stylus pen 201 calculated based on the sensing information to the electronic device 101 through the communication circuit 290.

The resonant circuit 287 may resonate based on an electromagnetic signal generated from a digitizer (e.g., the display device 160) of the electronic device 101 and may radiate an electro-magnetic resonance (EMR) input signal (or a magnetic field) by the resonance. The electronic device 101 may verify a location of the stylus pen 201 on the electronic device 101 by using the EMR input signal. For example, the electronic device 101 may verify a location of the stylus pen 201, based on a magnitude of an induced electromotive force (e.g., an output current) generated by the EMR input signal at each of a plurality of channels (e.g., a plurality of loop coils) in the digitizer.

The description given above is for the electronic device 101 and the stylus pen 201 operating based on an EMR scheme, but this is only an example. The electronic device 101 may generate an electric field-based signal by using an electrically coupled resonance (ECR) scheme. A resonant circuit of the stylus pen 201 may resonate by the electric field. The electronic device 101 may verify potentials of a plurality of channels (e.g., electrodes) formed by the resonance in the stylus pen 201 and may verify a location of the stylus pen 201 based on the potentials. The stylus pen 201 may be implemented by at least one of an active electrostatic scheme (AES), an EMR scheme, or an ECR scheme, and it may be understood by one skilled in the art that there is no limitation on a scheme to implement. In addition, the electronic device 101 may detect the stylus pen 201 based on a change in a capacitance (e.g., a self-capacitance or a mutual capacitance) associated with at least one electrode of a touch panel. In this case, the stylus pen 201 may not include a resonant circuit.

The memory 230 may store information associated with an operation of the stylus pen 201. For example, the information may include information for communication with the electronic device 101 and frequency information associated with an input operation of the stylus pen 201. In addition, the memory 230 may store a program, an application, an algorithm, or a processing loop for calculating information (e.g., coordinate information and/or displacement information) about a location of the stylus pen 201 from sensing data of the sensor 299. The memory 230 may store a communication stack of the communication circuit 290. Depending on a way to implement, the communication circuit 290 and/or the processor 220 may include a dedicated memory.

The resonant circuit 287 may include a coil (or an inductor) and/or a capacitor. The resonant circuit 287 may resonate based on an input electric field and/or an input magnetic field (e.g., an electric field and/or a magnetic field generated from the digitizer of the electronic device 101). In the case where the stylus pen 201 transmits a signal in the EMR scheme, the stylus pen 201 may generate a signal including a resonant frequency, based on an electromagnetic field generated from an inductive panel of the electronic device 101. In the case where the stylus pen 201 transmits a signal in the AES scheme, the stylus pen 201 may generate a signal by using the capacity coupling with the electronic device 101. In the case where the stylus pen 201 transmits a signal in the ECR scheme, the stylus pen 201 may generate a signal including a resonant frequency, based on an electric field generated from a capacitive device of the electronic device 101. The resonant circuit 287 may be used to change the intensity or a frequency of an electromagnetic field depending on a manipulating state of the user. For example, the resonant circuit 287 may provide various frequencies for recognizing a hovering input, a drawing input, a button input, or an erasing input. For example, the resonant circuit 287 may provide various resonant frequencies depending on a connection combination of a plurality of capacitors or may provide various resonant frequencies based on a variable inductor and/or a variable capacitor.

When the charging circuit 288 is connected with the resonant circuit 287 based on a switching circuit, the charging circuit 288 may rectify a resonant signal generated from the resonant circuit 287 to a direct current signal and may provide the direct current signal to the battery 289. The stylus pen 201 may determine whether the stylus pen 201 is inserted into the electronic device 101, by using a voltage level of the direct current signal detected from the charging circuit 288. Alternatively, the stylus pen 201 may verify a pattern corresponding to a signal checked by the charging circuit 288 to determine whether the stylus pen 201 is inserted into the electronic device 101.

The battery 289 may store a power necessary for an operation of the stylus pen 201. The battery 289 may include, for example, a lithium-ion battery or a capacitor, and may be rechargeable or exchangeable. The battery 289 may be charged by using a power (e.g., a direct current signal (or a direct current power)) provided from the charging circuit 288.

The communication circuit 290 may be configured to perform a wireless communication function between the stylus pen 201 and the communication module 190 of the electronic device 101. The communication circuit 290 may transmit state information of the stylus pen 201, input information of the stylus pen 201, and/or information associated with a location of the stylus pen 201 to the electronic device 101 by using a short-range communication scheme. The communication circuit 290 may transmit direction information (e.g., motion sensor data) of the stylus pen 201 obtained through the trigger circuit 298, voice information input through a microphone, or level information of the battery 289 to the electronic device 101. The communication circuit 290 may transmit sensing data obtained from the sensor 299 and/or information associated with a location of the stylus pen 201, which is verified based on the sensing data, to the electronic device 101. The communication circuit 290 may transmit information about a state of a button 337 provided in the stylus pen 201 to the electronic device 101. For example, the short-range communication scheme may include at least one of BLE, NFC, or Wi-Fi direct, but there is no limitation on a kind of the short-range communication scheme.

The antenna 297 may be used to transmit a signal or power to the outside of the electronic device 101 or to receive a signal or power from the outside of the electronic device 101. The stylus pen 201 may include a plurality of antennas 297 and may select at least one antenna 297 appropriate for a communication scheme from among the plurality of antennas 297. The communication circuit 290 may exchange a signal or power with an external electronic device through the at least one antenna 297 thus selected.

The trigger circuit 298 may include at least one button or sensor circuit. The processor 220 may verify an input scheme (e.g., a touch or a press) or a kind (e.g., an EMR button or a BLE button) of the button of the stylus pen 201. The trigger circuit 298 may transmit a trigger signal to the electronic device 101 by using an input signal of the button or a signal through the sensor 299.

The sensor 299 may include an accelerometer, a gyro sensor, and/or a geomagnetic sensor. The accelerometer may sense information about a linear movement of the stylus pen 201 and/or a three-axis acceleration of the stylus pen 201. The gyro sensor may sense information about rotation of the stylus pen 201. The geomagnetic sensor may sense information about a direction facing in the absolute coordinate system of the stylus pen 201. The sensor 299 may include a sensor capable of generating an electrical signal or a data value corresponding to an internal operation state of the stylus pen 201 or an external environment state, for example, at least one of a battery level detecting sensor, a pressure sensor, a light sensor, a temperature sensor, or a biometric sensor, in addition to a sensor for measuring a movement. The processor 220 may transmit the information obtained from the sensor 299 to the electronic device 101 through the communication circuit 290. Alternatively, the processor 220 may transmit information (e.g., the coordinates of the stylus pen 201 and/or a displacement of the stylus pen 201) associated with a location of the stylus pen 201 to the electronic device 101 through the communication circuit 290, based on the information obtained from the sensor 299.

Figure 3B:
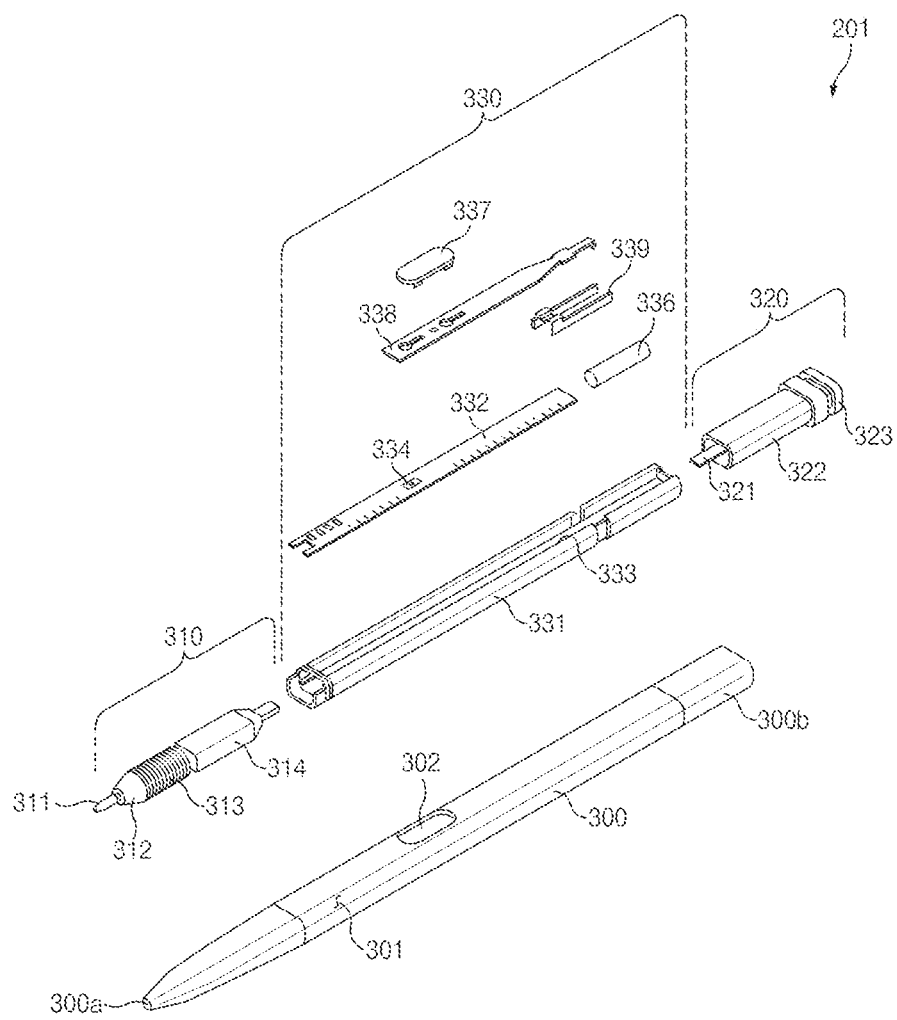
FIG. 3B is an exploded perspective view of a stylus pen, according to an embodiment.

FIG. 3B is an exploded perspective view of a stylus pen 201, according to an embodiment.

Referring to FIG. 3B, the stylus pen 201 includes a pen housing 300 forming the exterior of the stylus pen 201 and an inner assembly in the pen housing 300. The inner assembly may be inserted into the pen housing 300 through one assembling operation in a state where a plurality of parts mounted in the stylus pen 201 are coupled together. However, FIG. 3B is for describing embodiments implementing the stylus pen 201, and a shape or a structure of the stylus pen 201 may be changed within an enabling range.

The pen housing 300 may be elongated between a first end portion 300a and a second end portion 300b and may include a second receiving space 301 therein. The pen housing 300 may be in the shape of an ellipse, the cross section of which includes a short axis and a long axis, and may be formed in the shape of an elliptic cylinder on the whole. The first receiving space 212 of the electronic device 101, which is described above with reference to FIG. 2, may also have a cross section being elliptic so as to correspond to the shape of the pen housing 300. At least a portion of the pen housing 300 may include synthetic resin (e.g., plastic) and/or a metallic material (e.g., aluminum). The first end portion 300a of the pen housing 300 may be formed of a synthetic resin material. Various materials may be used to form the pen housing 300.

The inner assembly may have an elongated shape corresponding to the shape of the pen housing 300. The inner assembly may be roughly divided into three parts along a longitudinal direction. For example, the inner assembly may include a coil part 310 disposed at a location corresponding to the first end portion 300a of the pen housing 300, an ejection member 320 disposed at a location corresponding to the second end portion 300b of the pen housing 300, and a circuit board part 330 disposed at a location corresponding to a body of the pen housing 300.

The coil part 310 may include a pen tip 311 exposed to the outside of the first end portion 300a when the inner assembly is fully inserted into the pen housing 300, a packing ring 312, a coil 313 having a plurality of turns, and/or a writing pressure sensing unit 314 for obtaining a pressure change according to a pressure exerted on the pen tip 311. The packing ring 312 may include epoxy, rubber, urethane, or silicon. The packing ring 312 may be provided for the purpose of waterproofing and dustproofing and may protect the coil part 310 and the circuit board part 330 from dust or from being infiltrated into water. The coil 313 may form a resonant frequency in a given frequency band (e.g., 500 kilohertz (KHz)), and may be coupled to at least one element (e.g., a capacitive element (a capacitor)) to adjust the resonant frequency formed by the coil 313 within a given range.

The ejection member 320 may include a component for pulling out the stylus pen 201 from the first receiving space 212 of an electronic device 101. The ejection member 320 may include a shaft 321, an ejection body 322 disposed around the shaft 321 and forming the overall exterior of the ejection member 320, and a button part 323. When the inner assembly is fully inserted into the pen housing 300, a portion of the ejection member 320, which includes the shaft 321 and the ejection body 322, may be surrounded by the second end portion 300b of the pen housing 300, and at least a portion of the button part 323 may be exposed to the outside of the second end portion 300b. A plurality of parts, such as cam members or elastic members, may be disposed within the ejection body 322 to form a push-pull structure. The button part 323 may be substantially coupled to the shaft 321 to reciprocate linearly with respect to the ejection body 322. The button part 323 may include a button in which there is formed a stopper structure allowing the user to pull out the stylus pen 201 by using his/her nail. The stylus pen 201 may include a sensor detecting a linear reciprocating motion of the shaft 321, thus providing another input scheme.

The circuit board part 330 may include a PCB 332, a base 331 covering at least one surface of the PCB 332, and an antenna. A substrate seating part 333 on which the PCB 332 is disposed may be formed on an upper surface of the base 331, and the PCB 332 may be fixed in the state of being seated on the substrate seating part 333. The PCB 332 may include a first surface and a second surface. A variable capacitor or a switch 334 connected with the coil 313 may be disposed on the first surface, and a charging circuit, a battery 336, or a communication circuit may be disposed on the second surface. The first surface and the second surface of the PCB 332 may mean different stacking surfaces in a vertically stacked structure. Additionally or alternatively, the first surface and the second surface of the PCB 332 may mean different portions of the PCB 332, which are disposed along a longitudinal direction of the PCB 332. The battery 336 may include an electric double layered capacitor (EDLC). A charging circuit may be interposed between the coil 313 and the battery 336 and may include a voltage detector circuitry and a rectifier. Here, the battery 336 may not always be disposed on the second surface of the PCB 332. A location of the battery 336 may be variously changed depending on various mounting structures of the circuit board part 330, and the battery 336 may be disposed at a location different from that illustrated in FIG. 3B.

The antenna may include an antenna structure 339, which is exemplified in FIG. 3B, and/or an antenna embedded in the PCB 332. The switch 334 may be provided on the PCB 332. The second button 337 provided in the stylus pen 201 may be used to press the switch 334 and may be exposed to the outside through a side opening 302 of the pen housing 300. The second button 337 may be supported by a supporting member 338. When there is no external force exerted on the second button 337, the supporting member 338 may provide elastic restoring force to return or maintain the second button 337 to or at a given location. The second button 337 may be implemented with one of a physical key, a touch key, a pressure key, or in a key less manner, and there is no limitation on a way in which to implement a button.

The circuit board part 330 may include a packing ring such as an O-ring. O-rings formed of an elastic material may be disposed at opposite ends of the base 331 to form a sealing structure between the base 331 and the pen housing 300. The supporting member 338 may be partially in close contact with an inner wall of the pen housing 300 around the side opening 302 to form a sealing structure. As in the packing ring 312 of the coil part 310, the circuit board part 330 may include a waterproof and dustproof structure at least a portion thereof.

The stylus pen 201 may include a battery mounting part on the upper surface of the base 331 such that the battery 336 is disposed in the battery mounting part. The battery 336 that is mounted in the battery mounting part may include a cylinder-type battery.

The stylus pen 201 may include a microphone and/or a speaker. The microphone and/or the speaker may be directly connected with the PCB 332 or may be connected with a separate flexible printed circuit board (FPCB) connected with the PCB 332. The microphone and/or the speaker may be disposed parallel to the second button 337 in the longitudinal direction of the stylus pen 201.

Figure 4:
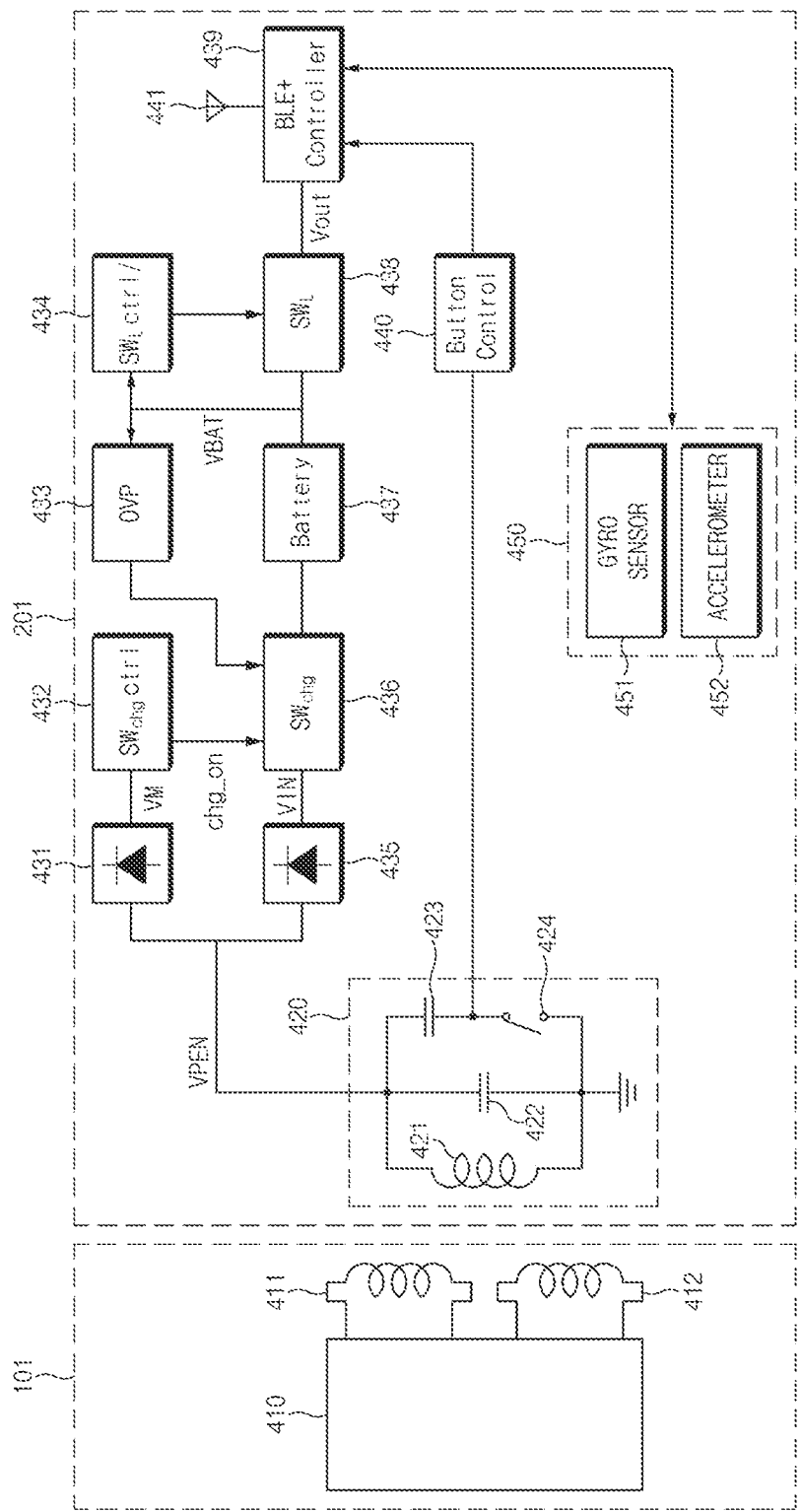
FIG. 4 is a diagram illustrating a configuration of an electronic device and a stylus pen, according to an embodiment.

FIG. 4 is a diagram illustrating a configuration of an electronic device 101 and a stylus pen (e.g., a pen controller 410), according to an embodiment.

Referring to FIG. 4, the pen controller 410 includes at least one amplifier connected with at least one coil 411 or 412. The pen controller 410 may provide a charging power to the stylus pen 201 through the at least one coil 411 or 412. When the stylus pen 201 is inserted into the receiving space of the electronic device 101, the at least one coil 411 or 412 may be disposed physically adjacent to a coil 421 of the stylus pen 201, but there is no limitation on a placement location.

Additionally or alternatively, the electronic device 101 may include a region (or a space) where the stylus pen 201 is capable of being mounted (or attached), in addition to the receiving space. In this case, the stylus pen 201 may be attached or detached to or from the corresponding region (or space). It may be understood by one skilled in the art that an operation of the stylus pen 201 placed in the receiving space is capable of being performed even when the stylus pen 201 is attached to a mounting region (or space). At least a part of functions of the pen controller 410 may be performed by the processor 120, or the pen controller 410 and the processor 120 may be integrally implemented. Alternatively, the pen controller 410 may be integrally implemented with a sensing panel controller to be described later.

The expression "the pen controller 410 performs a specific operation" may mean that the specific operation is performed by the processor 120 or is performed by a control circuit independent of the processor 120. The pen controller 410 may include a control circuit (e.g., a control circuit independent of the processor 120), an inverter, and/or an amplifier, in addition to the at least one coil 411 or 412. As described above, the pen controller 410 may not include the control circuit; in this case, the pen controller 410 may provide a charging signal to the at least one coil 411 or 412 under the control of the processor 120.

The pen controller 410 may provide a signal having a pattern through the at least one coil 411 or 412. The pattern may be in advance shared with the stylus pen 201 for a control of the stylus pen 201 and may include, for example, a charging start indicating pattern, a charging end indicating pattern, or a detection pattern. However, there is no limitation on a kind of the pattern. The at least one coil 411 and 412 for providing the charging signal or the signal having the control pattern are illustrated, but this is only one example. There is no limitation on the number of coils.

A resonant circuit 420 of the stylus pen 201 may include the coil 421, at least one capacitor 422 or 423, and/or a switch 424. When the switch 424 is in an OFF state, the coil 421 and the capacitor 422 may constitute a resonant circuit; when the switch 424 is in an ON state, the coil 421 and the capacitors 422 and 423 may constitute a resonant circuit. That is, as the switch 424 is turned on/off, a resonant frequency of the resonant circuit 420 may be changed. For example, the electronic device 101 may verify an ON/OFF state of the switch 424, based on a frequency of a signal from the stylus pen 201. In addition, when the button 337 of the stylus pen 201 is pressed/released, the switch 424 may be turned on/off, and the electronic device 101 may determine whether the button 337 of the stylus pen 201 is pressed, based on a frequency of a signal received through the digitizer.

At least one rectifier 431 or 435 may rectify and output a signal VPEN of an alternating current (AC) waveform output from the resonant circuit 420. A charging switch controller ($SW_{chg}$ ctrl) 432 may receive a rectified signal VM output from the rectifier 431. Based on the rectified signal VM, the charging switch controller 432 may determine whether a signal generated by the resonant circuit 420 is a signal for charging or a signal for location detection. For example, the charging switch controller 432 may determine whether the signal generated by the resonant circuit 420 is the signal for charging or the signal for location detection, based on a magnitude of a voltage of the rectified signal VM. Alternatively, the charging switch controller 432 may determine whether a signal having a pattern for charging start is input, based on a waveform of the rectified signal VM.

When it is determined that the signal is the signal for charging, the charging switch controller 432 may control a charging switch (SW c h g) 436 to an ON state. Alternatively, when the signal having the pattern for charging start is detected, the charging switch controller 432 may control the charging switch 436 to an ON state. The charging switch controller 432 may transfer a charging start signal chg on to the charging switch 436. In this case, a rectified signal voltage input (VIN) may be transferred to a battery 437 through the charging switch 436. The battery 437 may be charged by using the rectified signal VIN thus received. An over-voltage protection circuit (OVP) 433 may verify a battery voltage (VBAT) and may control the charging switch 436 to an OFF state when the battery voltage VBAT exceeds an over-voltage threshold value.

When it is determined that the battery voltage VBAT exceeds an operating voltage threshold value, a load switch controller ($SW_L$ ctrl) 434 may control a load switch (SW L)

438 to an ON state. When the load switch 438 is turned on, power from the battery 437 may be transferred to a BLE communication circuit and controller (BLE+controller) 439. The BLE communication circuit and controller 439 may operate using the received power. When a distance between the stylus pen 201 and the electronic device 101 is greater than a threshold distance, a button control circuit (a button control) 440 may transfer information about an input of a button 337 to the BLE communication circuit and controller 439. The BLE communication circuit and controller 439 may transmit the received information about the button input to the electronic device 101 through an antenna 441. A sensor 450 may include a gyro sensor 451 and an accelerometer 452. The gyro sensor 451 and/or the accelerometer 452 may transfer sensing data obtained by the accelerometer 452 to the BLE communication circuit and controller 439. The BLE communication circuit and controller 439 may transmit a communication signal including the received sensing data to the electronic device 101 through the antenna 441. Alternatively, the BLE communication circuit and controller 439 may verify information (e.g., coordinates and/or displacement of the stylus pen 201) associated with a location of the stylus pen 201 determined based on the received sensing data. The BLE communication circuit and controller 439 may transmit the verified information associated with the location of the stylus pen 201 to the electronic device 101 through the antenna 441. When the stylus pen 201 is pulled out from the electronic device 101, the BLE communication circuit and controller 439 may activate the accelerometer 452. When the button 337 is pressed, the BLE communication circuit and controller 439 may activate the gyro sensor 451. There is no limitation on an activation time for each sensor. In addition, the sensor 450 may further include a geomagnetic sensor. When only the accelerometer 452 is activated, the stylus pen 201 may provide information of an acceleration measured by the accelerometer 452 to the electronic device 101, and the electronic device 101 may operate based on both the acceleration information and the location of the stylus pen 201 verified based on a pen signal.

Figure 5:
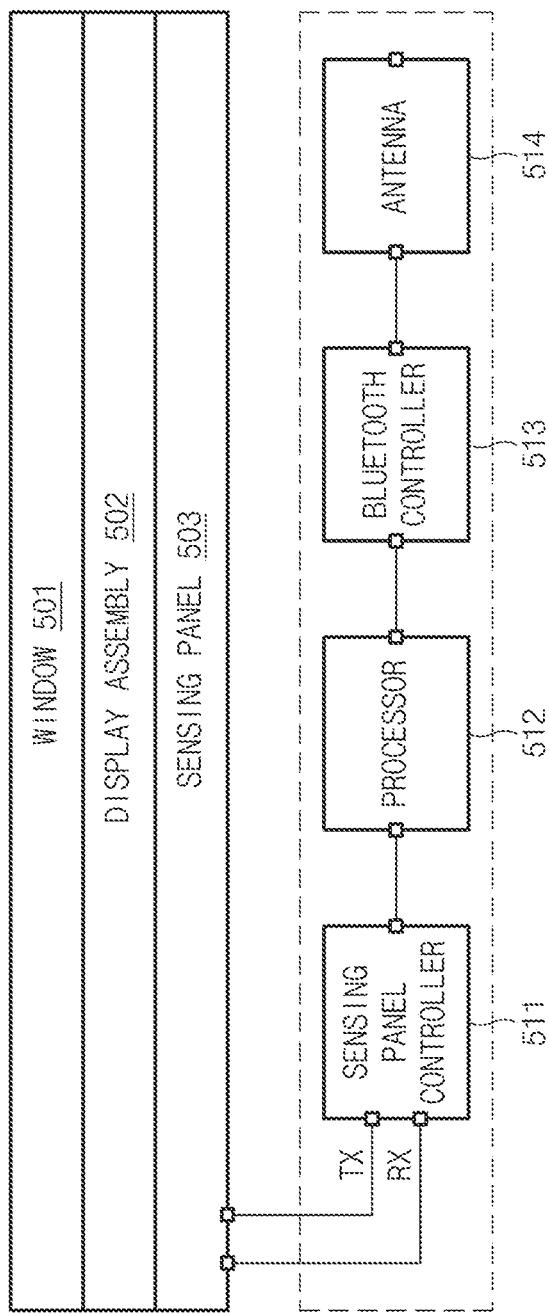
FIG. 5 illustrates a diagram for describing a configuration of an electronic device, according to an embodiment.

FIG. 5 illustrates a diagram for describing a configuration of an electronic device, according to an embodiment.

Referring to FIG. 5, the electronic device 101 includes a sensing panel controller 511, a processor 512, a Bluetooth controller 513, and/or an antenna 514. The electronic device 101 includes a sensing panel 503, a display assembly 502 disposed on the sensing panel 503, and/or a window 501 disposed on the display assembly 502. The sensing panel 503 may be implemented with a digitizer, and/or a touch sensor panel for sensing a touch of the user may be further disposed on or under the sensing panel 503. The touch sensor panel may be placed on the display assembly 502. The sensing panel 503 may be implemented with the digitizer and may include a plurality of loop coils. In the case where the sensing panel 503 is implemented with the digitizer, the sensing panel 503 may include an element (e.g., an amplifier) for applying an electrical signal (e.g., a transmit signal) to the loop coils. The sensing panel 503 may include an element (e.g., an amplifier, a capacitor, or an analog to digital converter (ADC)) for processing signals (e.g., input signals) output from the loop coils. The sensing panel 503 may verify a location of the stylus pen 201 based on magnitudes of signals respectively output from the loop coils (e.g., digital values converted for respective channels) and may output information about the verified location to the processor 120.

Alternatively, the processor 120 may verify a location of the stylus pen 201 based on magnitudes of signals respectively output from the loop coils (e.g., digital values converted for respective channels). For example, the sensing panel 503 may apply a current to at least one of the loop coils, and the at least one coil may form a magnetic field. The stylus pen 201 may resonate by the magnetic field formed around the stylus pen 201, and a magnetic field may be formed from the stylus pen 201 by the resonance. A current may be output from each of the loop coils by the magnetic field formed from the stylus pen 201. The electronic device 101 may verify a location of the stylus pen 201 based on magnitudes of currents for respective channels of the loop coils (e.g., converted digital values). To determine a location of the stylus pen 201, the loop coils may include coils extended in one axis direction (e.g., an x-axis direction) and coils extended in another axis direction (e.g., a y-axis direction), but there is no limitation on a way to arrange the stylus pen 201 with respect to the loop coils.

The sensing panel controller 511 may apply a transmit signal TX to at least a part of the plurality of loop coils of the sensing panel 503, and a loop coil receiving the transmit signal TX may form a magnetic field. The sensing panel controller 511 may receive a receive signal RX output from at least a part of the plurality of loop coils in a time division manner. The sensing panel controller 511 may verify a location of the stylus pen 201 based on the receive signal RX and may transfer information about the location of the stylus pen 201 to the processor 512. For example, magnitudes of the receive signals RX of the respective loop coils (e.g., respective channels) may be different, and a location of the stylus pen 201 may be verified based on the magnitudes of the receive signals RX. In addition, the electronic device 101 may determine whether the button 337 of the stylus pen 201 is pressed, based on a frequency of a receive signal RX. For example, when the frequency of the receive signal RX is a first frequency, the electronic device 101 may determine that the button of the stylus pen 201 is in a state of being pressed; when the frequency of the receive signal RX is a second frequency, the electronic device 101 may determine that the button of the stylus pen 201 is in a state of being released. Alternatively, in the case where the sensing panel 503 is implemented with a touch sensing panel (TSP), the sensing panel 503 may verify a location of the stylus pen 201 based on an output signal from an electrode. Alternatively, the electronic device 101 may detect the stylus pen 201 based on a change in a capacitance (e.g., a mutual capacitance or a self-capacitance) at an electrode of the sensing panel 503. Hardware, which is capable of sensing a pen signal from the stylus pen 201, such as the digitizer or the touch sensing panel may be referred as to as the "sensing panel 503". In the case of verifying a location of the stylus pen 201 by using the touch sensing panel, the electronic device 101 may determine whether the button is pressed, based on a received communication signal. The electronic device 101 may detect the stylus pen 201 (or a location of the stylus pen 201) by recognizing a static electricity based on an AES scheme.

The sensing panel controller 511 may determine whether the stylus pen 201 is inserted into (or coupled or attached to) the electronic device 101, based on a receive signal RX and may transfer a result of the determination to the processor 512. The sensing panel controller 511 may be integrally implemented with the sensing panel 503. The processor 512 may transmit a signal for wireless charging, based on whether the stylus pen 201 is inserted into the electronic device 101. The processor 512 may control the Bluetooth controller 513 based on whether the stylus pen 201 is inserted into the electronic device 101. When a wireless communication connection is not formed, the processor 512 may control the Bluetooth controller 513 such that wireless communication with the stylus pen 201 is connected. In addition, the processor 512 may transmit charging level information to the electronic device 101 when the stylus pen 201 is mounted therein and may transmit information about a button press and information about sensing data to the electronic device 101 when the stylus pen 201 is detached therefrom. In addition, the processor 512 may allow a charging signal and a control signal to be transmitted to the sensing panel controller 511, based on data received from the stylus pen 201. The processor 512 may verify a gesture of the stylus pen 201 based on the data received from the stylus pen 201 and may perform an operation corresponding to the gesture. The processor 512 may transfer a function mapped on the gesture to an application. The Bluetooth controller 513 may exchange information with the stylus pen 201 through the antenna 514. The display assembly 502 may include a component for displaying a screen. The window 501 may be formed of a transparent material such that at least a portion of the display assembly 502 is visually exposed.

Figure 6:
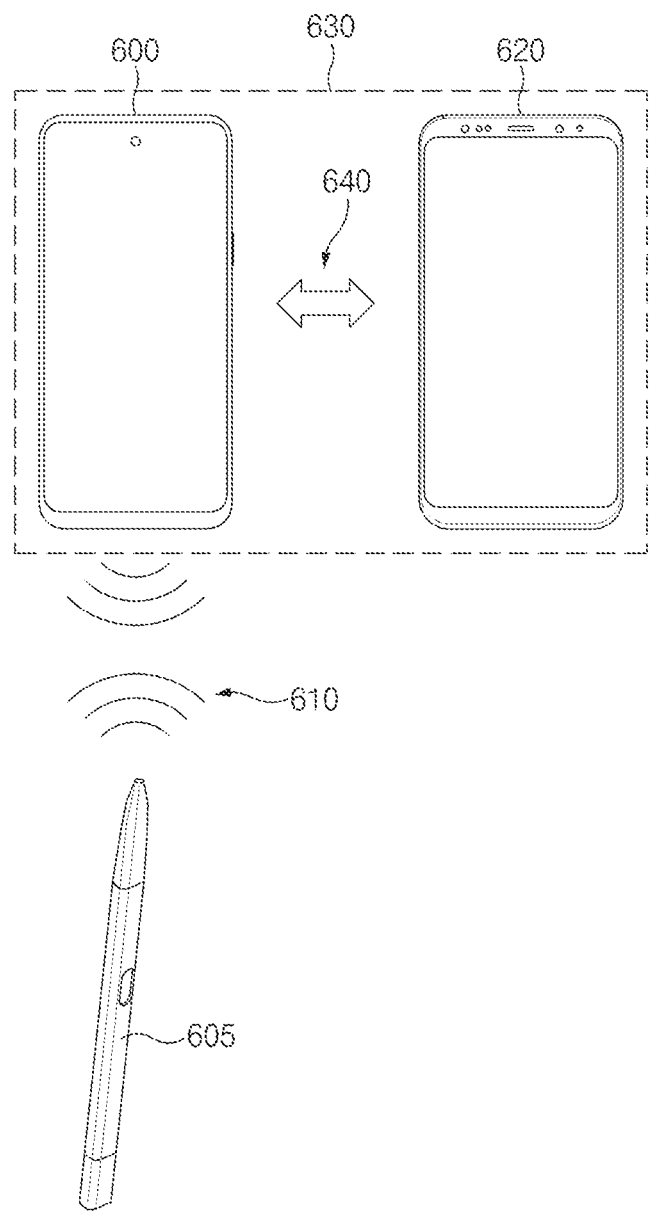
FIG. 6 illustrates a structure in which an electronic device shares a peripheral device having a shape of an electronic pen with an external electronic device being a mobile device, according to an embodiment.

FIG. 6 illustrates a structure in which an electronic device 600 shares a peripheral device 605 having a shape of an electronic pen with an external electronic device 620 being a mobile device, according to an embodiment. The external electronic device 620 may be a device having a configuration similar to that of the electronic device 600.

Referring to FIG. 6, the peripheral device 605 may be coupled to the electronic device 600 through a coupling structure (e.g., the first receiving space 212 of FIG. 2) of the electronic device 600. When the peripheral device 605 is coupled to the electronic device 600, the electronic device 600 and the peripheral device 605 may form a communication connection mutually. One of the electronic device 600 and the peripheral device 605 may transmit an advertising packet, and the other thereof may receive the advertising packet. Short-range wireless communication 610 may be connected between the electronic device 600 and the peripheral device 605 by the transmission and reception of the advertising packet. The short-range wireless communication 610 may be based on a BLE communication scheme.

At least a portion of information that is used to form the short-range wireless communication connection may be stored in the electronic device 600 and the peripheral device 605 in the process of manufacturing the electronic device 600 and the peripheral device 605. For example, the electronic device 600 and the peripheral device 605 may store key information (e.g., a long term key) and device information generated through a pairing process based on the BLE communication protocol. In the case where short-range wireless communication between the electronic device 600 and the peripheral device 605 is connected, without an additional pairing process, it may be possible to encrypt a channel for short-range wireless communication through the key information stored in the manufacturing process and to transmit data through the encrypted channel.

In the case where the peripheral device 605 is coupled to the first inner space 212 of the electronic device 600 in a state where device information and key information about the peripheral device 605 are not stored in the electronic device 600, the peripheral device 605 may transmit the advertising packet that the electronic device 600 is able to recognize, and the electronic device 600 may receive the advertising packet and may then connect short-range wireless communication through a connection request. Afterwards, the electronic device 600 and the peripheral device 605 may generate key information through the pairing process, may encrypt the channel for short-range wireless communication by using the generated key information, and may transmit data through the encrypted channel.

In a state where the short-range wireless communication 600 is connected, input information that the peripheral device 605 obtains may be transmitted to the electronic device 600 through the short-range wireless communication 610. For example, the electronic device 600 may use the peripheral device 605 as an input device. Additionally or alternatively, the peripheral device 605 may be a different type of device, not an electronic pen, and the electronic device 600 may use the peripheral device 605 as an output device or a data storage device.

The electronic device 600 may form a cluster 630 with the external electronic device 620 placed around the electronic device 600. The cluster 630 may mean a set of devices exchanging signals periodically or frequently. To form the cluster 630, the electronic device 600 and the external electronic device 620 may transmit or receive a signal by using a short-range wireless communication scheme. In FIG. 6, only the electronic device 600 and the external electronic device 620 are present in the cluster 630, but more devices may be included in the cluster 630.

The electronic device 600 may broadcast the advertising packet based on a first communication scheme. For example, the electronic device 600 may transmit a BLE advertising signal based on the BLE communication scheme. A time when the BLE advertising signal is transmitted may be variously implemented depending on the embodiment. For example, the electronic device 600 may broadcast the BLE advertising signal periodically. Alternatively, when a specified condition is satisfied, the electronic device 600 may broadcast the BLE advertising signal. The advertising packet may include a communication service identifier for identifying a communication service that is performed based on a second communication scheme. For example, the advertising packet may include a Wi-Fi Aware service identification (ID) for enabling a Wi-Fi Aware function. The external electronic device 620 receiving the advertising packet may enable the Wi-Fi Aware function corresponding to the Wi-Fi Aware service ID to form the cluster 630 with the electronic device 600. Also, when the electronic device 600 receives the advertising packet, the electronic device 600 may enable the Wi-Fi Aware function. For example, when one or more external electronic devices exist in the vicinity of the electronic device 600 and a cluster to which the respective devices belong does not exist, the electronic device 600 may form a cluster with one or more external electronic devices within a specified range to generate a common wake/sleep heartbeat. Additionally or alternatively, when a cluster to which an external electronic device belongs exists around the electronic device 600, the electronic device 600 may join the cluster; or when the electronic device 600 belongs to a first cluster and an external electronic device placed around the electronic device 600 belongs to a second cluster, the electronic device 600 and the external electronic device may perform a merge process for merging the first cluster and the second cluster. The merge process may mean to set communication such that devices included in the first cluster and devices included in the second cluster are synchronized and find a service with any other device without continuous data transmission/reception.

The electronic device 600 may select the external electronic device 620, which will share a function of the peripheral device 605, from among devices included in the cluster 630. The electronic device 600 may establish a wireless data communication path 640 with the selected external electronic device 620. The wireless data communication path 640 may be a communication path configured to transmit or receive data between two electronic devices by using a Wi-Fi communication scheme or a Bluetooth™ communication scheme. For example, the electronic device 600 may transmit a service search protocol message for searching for a service associated with the function of the peripheral device 605 to be shared, to one or more other devices (e.g., the external electronic device 620) in a cluster. The expression "transmitting the service search protocol message" may mean that the electronic device 600 publishes a message.

The external electronic device 620 receiving the message may find a service by using the message and may transmit, to the electronic device 600, information about whether the service is available. For example, the external electronic device 620 may transmit, to the electronic device 600, a subscribe message indicating that a corresponding device has to transmit a publish message when a specific condition is satisfied. The electronic device 600 may select the external electronic device 620 capable of providing a service associated with the function of the peripheral device 605. The electronic device 600 may transmit input information received from the peripheral device 605 to the external electronic device 620 through the wireless data communication path 640 and may allow the external electronic device 620 to operate as if the external electronic device 620 connects to the peripheral device 605 and uses the peripheral device 605 as an input device. The electronic device 600 may receive input information from the peripheral device 605 and may transmit the received input information to the external electronic device 620. In detail, the input information may include gesture information, pressure information, location information, biometric information, or temperature information input by using a sensor 299 of the peripheral device 605 or an input value through a press of a button 337. In response to the gesture information, the external electronic device 620 may execute instructions that cause a camera application of the external electronic device 620 to photograph an image by using a camera of the external electronic device 620.

The electronic device 600 may search a memory 130 of the electronic device 600 for a control command corresponding to the input information received from the peripheral device 605. The electronic device 600 may transmit the found control command to the external electronic device 620 such that the external electronic device 620 executes the control command.

Figure 7:
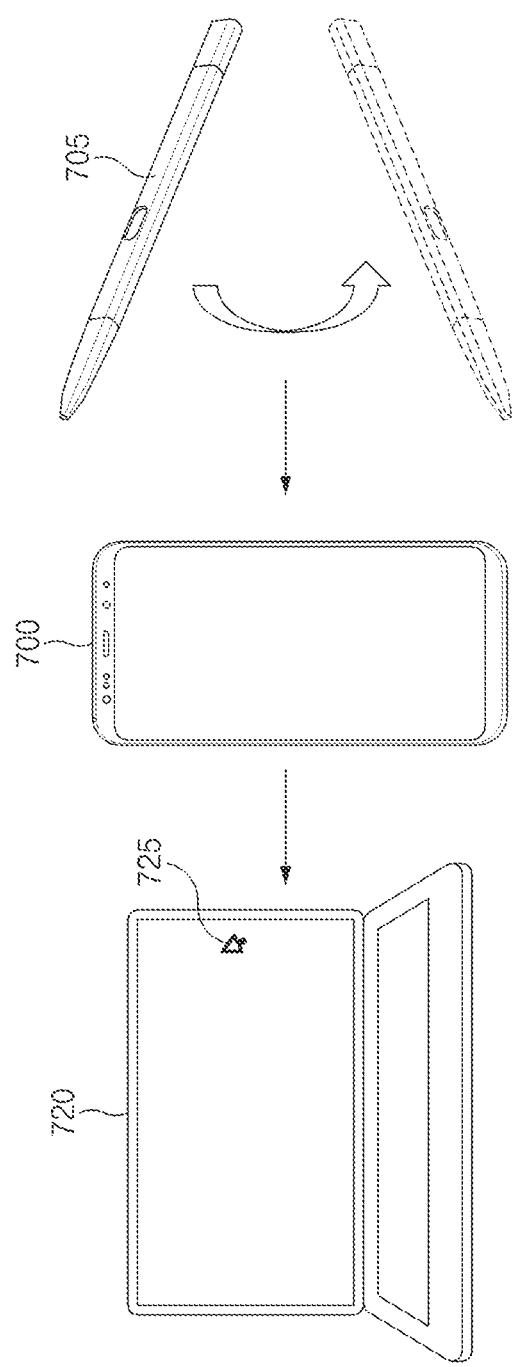
FIG. 7 illustrates a structure in which an electronic device shares a peripheral device having a shape of an electronic pen with an external electronic device being a laptop personal computer (PC), according to an embodiment.

FIG. 7 illustrates a structure in which an electronic device 700 shares a peripheral device 705 having a shape of an electronic pen with an external electronic device 720 being a laptop PC, according to an embodiment.

The external electronic device 720 may include various types of devices capable of providing a service that performs communication with the electronic device 700 and uses the peripheral device 705.

Referring to FIG. 7, the peripheral device 705 may obtain input information corresponding to a movement of the peripheral device 705 sensed by using a sensor (e.g., an accelerometer, a gesture sensor, or a gyro sensor) included in the peripheral device 705. The external electronic device 720 may receive the input information of the peripheral device 705 through the electronic device 700 and may execute an air mouse function for moving a location of a cursor 725 displayed through a screen of the external electronic device 720, by using the received input information.

A plurality of devices including the external electronic device 720 may be manipulated by using the peripheral device 705. When the location of the cursor 725 is out of the screen of the external electronic device 720 by the input information received from the peripheral device 705, the cursor 725 may be displayed at any other device.

When an input (e.g., a specific key input or an input through a button (e.g., the button part 323 of FIG. 3B) of the external electronic device 720) specified to the electronic device 700 or the external electronic device 720 is received, the electronic device 700 may switch a device, to which the input information received from the peripheral device 705 is to be transferred, from the external electronic device 720 to any other device. Alternatively, the electronic device 700 may determine a device, to which the input information is to be transferred, based on a function or an application being executed at the electronic device 700 or the external electronic device 720. For example, when the electronic device 700 executes a gallery application displaying an image of a photo file, the electronic device 700 may transfer the input information to the external electronic device 720 or any other device capable of photographing an image.

Figure 8:
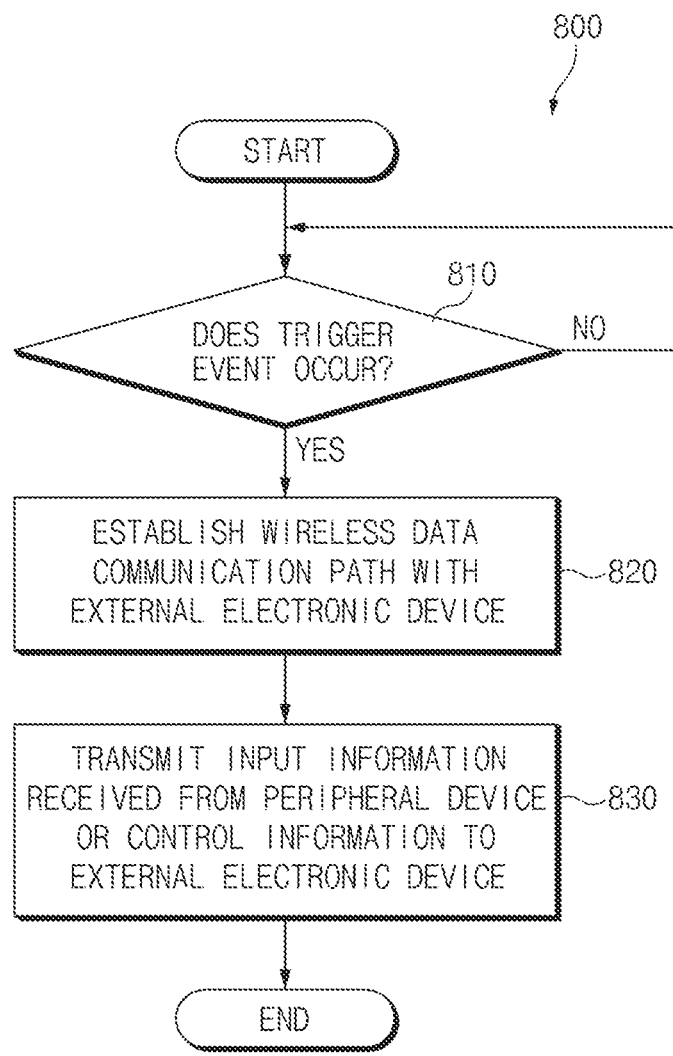
FIG. 8 is a flowchart illustrating a process that an electronic device performs, according to an embodiment.

FIG. 8 is a flowchart 800 illustrating a process that an electronic device performs, according to an embodiment.

In step 810, the electronic device determines (or monitors) whether a trigger event occurs. The trigger event means an event that causes the electronic device to enable a wireless communication function (e.g., a Wi-Fi Aware function) for communicating with an external electronic device. For example, the trigger event may include a signal of sensing that a peripheral device is detached from a coupling structure of the electronic device. In another example, the trigger event may include a user input that is received by using a user interface displayed on a display device of the electronic device and indicates an enable function of the wireless communication. In yet another example, the trigger event may include receiving an advertising packet including a service ID corresponding to the wireless communication function.

However, the disclosure is not limited thereto and the trigger event may be variously implemented depending on embodiments. For example, when a user input is received for selecting a menu for executing a peripheral device sharing function displayed at the electronic device, the electronic device may determine that the trigger event occurs. Alternatively, when a share camera application allowing the electronic device to share a camera function with the external electronic device is executed, the electronic device may determine that the trigger event occurs. In yet another example, the electronic device may obtain location information of the electronic device (e.g., may obtain a global positioning system (GPS) coordinate value); when the location information of the electronic device indicates that the electronic device is present in a specified region (e.g., a photo zone of a tourist spot), the electronic device may determine that the trigger event occurs. Alternatively, the trigger event may occur at the peripheral device or the external electronic device. For example, when information about a button input of the peripheral device is transferred to the electronic device, the electronic device may determine that the trigger event occurs. Alternatively, in yet another example, when a request for sharing the peripheral device is received from the external electronic device, the electronic device may determine that the trigger event occurs.

When it is determined that the trigger event occurs, in step 820, the electronic device establishes a wireless data communication path with the external electronic device. In step 820, when a communication function (e.g., a Wi-Fi Aware function) for performing wireless data communication with the external electronic device is in a disable state, the electronic device may enable the communication function. Also, the electronic device may allow the external electronic device placed around the electronic device to enable the communication function (e.g., a Wi-Fi Aware function). The electronic device may form a cluster including the external electronic device based on the enabled communication function. The electronic device may select the external electronic device included in the cluster and may establish a wireless data communication path (e.g., a neighborhood area network (NAN) data path) for transmitting data to the external electronic device.

In step 830, the electronic device transmits input information (or control information) received from the peripheral device through short-range wireless communication to the external electronic device through the wireless data communication path. For example, the electronic device may transmit gesture information received from an electronic pen through BLE communication to the external electronic device through a Wi-Fi communication connection. In the case where the NAN data path (or channel) is formed with the external electronic device, the electronic device may transfer the input information received from the peripheral device through the NAN data path to the external electronic device.

The electronic device may transmit control information corresponding to the input information received from the peripheral device to the external electronic device. The electronic device may receive gesture information from the electronic pen and may determine characteristic information, which corresponds to characteristic information extracted from the received gesture information, from among data stored in the electronic device. In the case where the control information stored in association with the determined characteristic information relates to instructions causing a camera to photograph an image, the electronic device may transmit the control information for image photographing to the external electronic device. Additionally or alternatively, as a button input of the electronic pen is received, the electronic device may transmit an application switch command to the external electronic device or may transmit control information corresponding to an input value to the external electronic device.

FIG. 8 shows an embodiment in which input information or control information is transferred through the wireless data communication path (e.g., a NAN data path) established between the electronic device and the external electronic device; however, the electronic device and the external electronic device may share the input information or the control information in a disconnection state, based on the Wi-Fi Aware standard. In this case, the electronic device may not establish the wireless data communication path with the external electronic device and may transmit input information received through a NAN discovery channel to the external electronic device.

Figure 9:
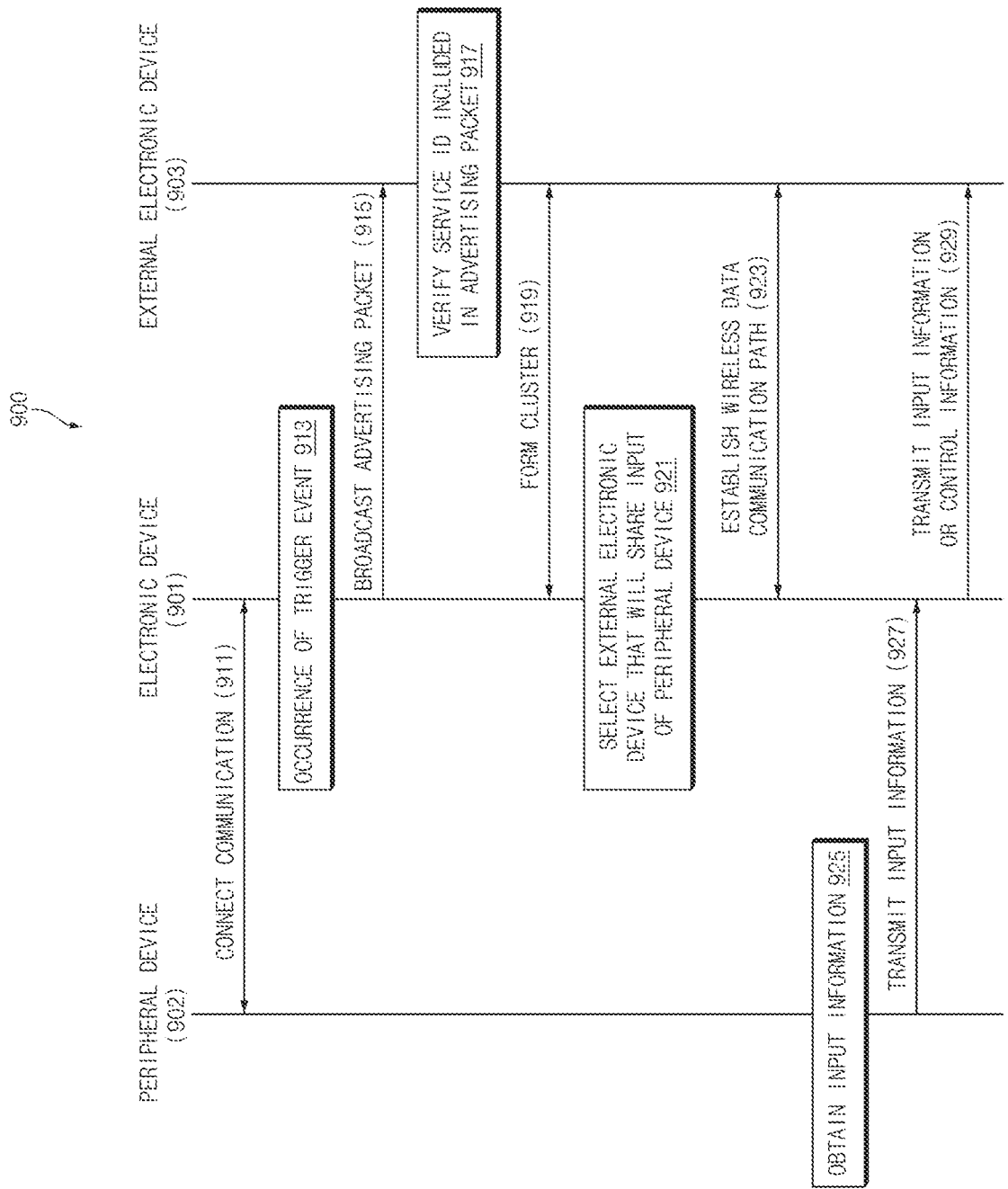
FIG. 9 is a flowchart illustrating a process in which an electronic device shares input information received from a peripheral device with an external electronic device, according to an embodiment.

FIG. 9 is a flowchart 900 illustrating a process in which an electronic device 901 shares input information received from a peripheral device 902 with an external electronic device 903, according to an embodiment.

In step 911, the electronic device 901 connects short-range wireless communication with the peripheral device 902. For example, when the electronic device 901 senses a state where the peripheral device 902 is connected to a coupling structure of the electronic device 901, the electronic device 901 may obtain identification information of the peripheral device 902 connected with the electronic device 901 and may connect the short-range wireless communication with the peripheral device 902 based on a Bluetooth communication scheme. The electronic device 901 may receive input information from the peripheral device 902 through the short-range wireless communication. For example, when the stylus pen 201 is inserted into the inner space 212 of the electronic device 101, the electronic device 101 may connect the short-range wireless communication for receiving input information from the stylus pen 201.

In step 913, the electronic device 901 determines whether the trigger event occurs. When it is determined that the trigger event occurs, in step 915, the electronic device 901 broadcasts the advertising packet including a service ID (e.g., a Wi-Fi Aware service ID) used to identify a service for performing communication with the external electronic device 903. The electronic device 901 may transmit the advertising packet based on the BLE communication standard. Also, the electronic device 901 may enable a communication function (e.g., Wi-Fi Aware) for performing communication with the external electronic device 903.

In step 917, the external electronic device 903 receives the advertising packet and verifies the service ID included in the advertising packet. The external electronic device 903 may perform a BLE scan and may receive the advertising packet that the electronic device 901 transmits, as a result of the BLE scan. The external electronic device 903 may be connected to an access point where the electronic device 901 is connected and may receive the advertising packet through the access point. Alternatively, in the case where the electronic device 901 and the external electronic device 903 log in to a server by using the same user account, the external electronic device 903 may receive the advertising packet through the server. In the case where the service ID is included in the advertising packet, the external electronic device 903 may enable a communication function (e.g., Wi-Fi Aware) corresponding to the service ID.

When the communication functions of the external electronic device 903 and the electronic device 901 placed within a short range from each other are enabled, a cluster including the electronic device 901 and the external electronic device 903 may be formed. The electronic device 901 and the external electronic device 903 may periodically transmit a sync beacon packet (e.g., a NAN sync beacon) for the purpose of forming the cluster, and the cluster including the electronic device 901 and the external electronic device 903 may be formed.

In step 921, the electronic device 901 selects the external electronic device 903 that will share an input of the peripheral device 902 within the cluster to which the electronic device 901 belongs. An operation in which the electronic device 901 selects the external electronic device 903 may be variously implemented. For example, the electronic device 901 may output a device list including devices included in a cluster as candidate devices and may receive a user input of selecting the external electronic device 903 in the output device list. Alternatively, the electronic device 901 may transmit information requesting to receive an input of the peripheral device 902 to the devices included in the cluster and may select a device responding to the request.

When a given condition is satisfied, the electronic device 901 may automatically select the external electronic device 903 without a user input. For example, in the case where the external electronic device 903 is a device whose account is identical to an account of the electronic device 901 or is a device having a family account of the electronic device 901, the electronic device 901 may select the external electronic device 903. In this case, the electronic device 901 may output information associated with the external electronic device 903 connected thereto, for example, a message providing notification that the peripheral device 902 is shared by the external electronic device 903.

In step 923, the electronic device 901 establishes a wireless data communication path with the external electronic device 903 thus selected. For example, the electronic device 901 may establish a Wi-Fi communication connection with the external electronic device 903. Additionally, among the devices included in the cluster, each of the electronic device 901 and the external electronic device 903 may disable a specified communication function (e.g., a Wi-Fi Aware function) or may stop an operation during a specified time period.

In step 925, the peripheral device 902 obtains input information. For example, the peripheral device 902 may obtain movement information corresponding to a physical movement of the peripheral device 902 sensed through a sensor (e.g., an accelerometer or a gyro sensor) included in the peripheral device 902. The input information may include a button input or pressure information of a pen.

In step 927, the peripheral device 902 transmits the obtained input information to the electronic device 901 through the short-range wireless communication connected in operation 911.

In step 929, the electronic device 901 transmits the input information received from the peripheral device 902 or control information corresponding to the input information to the external electronic device 903 through the wireless data communication path established in step 923. For example, when the received input information includes gesture information for performing a specified function of the external electronic device 903, the electronic device 901 may transmit control information for performing the specified function of the external electronic device 903 to the external electronic device 903. The external electronic device 903 receiving the input information or the control information may execute instructions corresponding to the input information or the control information.

In the case where the wireless data communication path between the external electronic device 903 and the electronic device 901 is not established, in step 929, a processor 120 of the electronic device 901 executes instructions that correspond to the received input information and are stored in the memory 130. For example, in the case where the received input information includes specified gesture information, the electronic device 901 may execute an operation of photographing an image by using a camera application executed by the electronic device 901.

The electronic device 901 may select a device that will process the input information or the control information. For example, the electronic device 901 or the external electronic device 903 may be selected based on a user input received through a user interface that the electronic device 901 displays, or the electronic device 901 and the external electronic device 903 may be selected as operating together. In step 929, the electronic device 901 determines whether to transmit the input information or the control information to the external electronic device 903.

Figure 10:
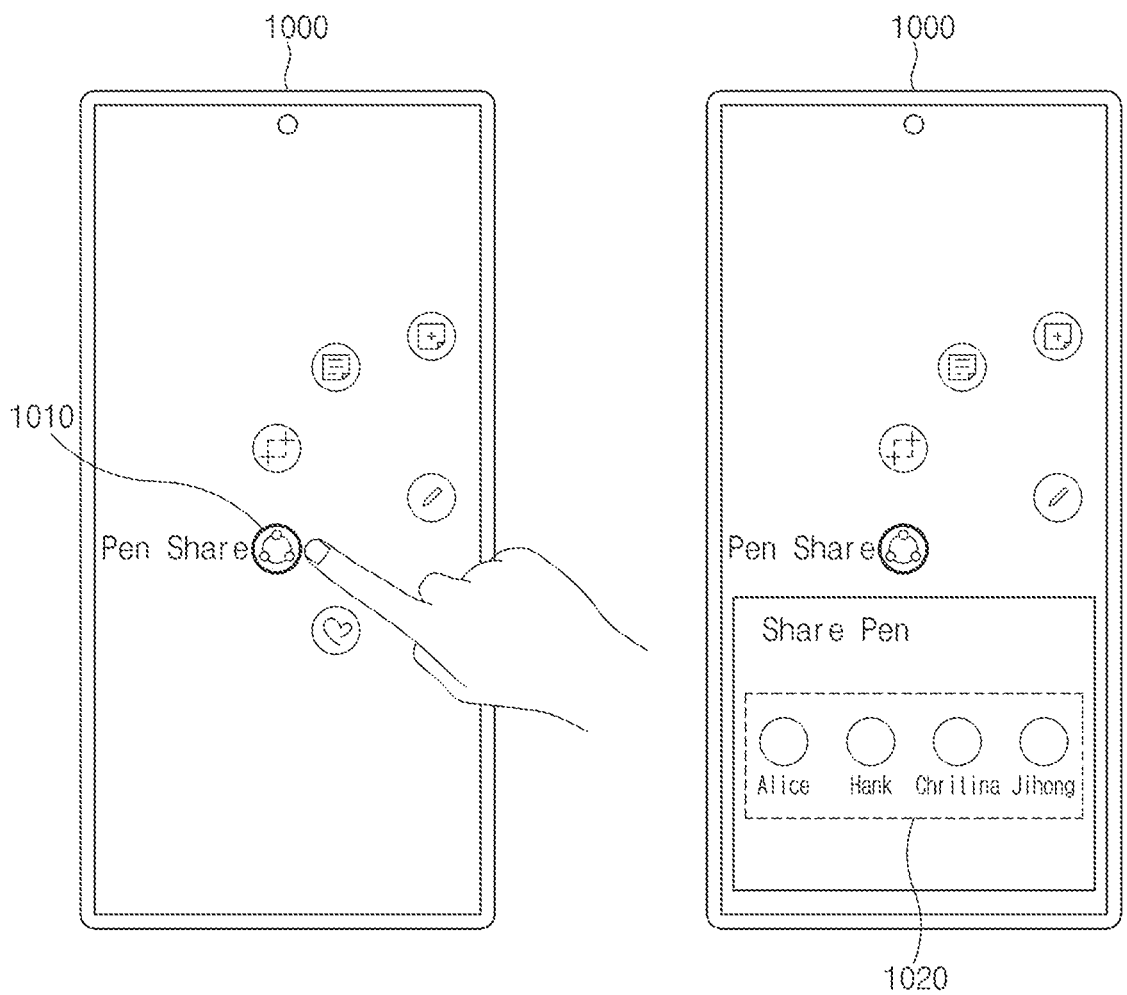
FIG. 10 illustrates an example of a user interface that an electronic device displays to enable a share function for a peripheral device, according to an embodiment.

FIG. 10 illustrates an example of a user interface that an electronic device 1000 displays to enable a share function for a peripheral device, according to an embodiment.

Referring to FIG. 10, the electronic device 1000 displays an icon 1010 for enabling the share function for the peripheral device. The electronic device 1000 may receive a user input of selecting the icon 1010, as a trigger event for enabling the share function for the peripheral device. When the icon 1010 is selected, the electronic device 1000 may broadcast the advertising packet. The electronic device 1000 may enable a communication function for performing communication with an external electronic device and may form a cluster with surrounding devices that receive the advertising packet and include the external electronic device.

When the cluster is formed with the surrounding devices, the electronic device 1000 may display a device list 1020 including identification information about at least one device included in the cluster.

Figure 11:
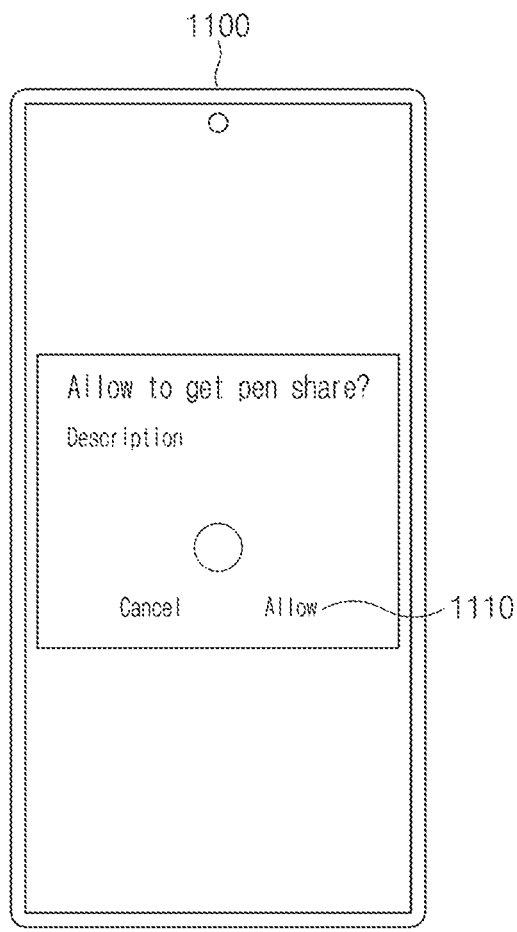
FIG. 11 illustrates an example of a user interface that an external electronic device displays to enable a share function for a peripheral device, according to an embodiment.

FIG. 11 illustrates an example of a user interface that an external electronic device 1100 displays to enable a share function for a peripheral device, according to an embodiment.

Referring to FIG. 11, the external electronic device 1100 may receive the advertising packet that an electronic device transmits. When a specified service ID is included in the received advertising packet, the external electronic device 1100 may display a user interface 1110 for receiving confirmation about whether to allow the share function for the peripheral device with respect to the electronic device.

The electronic device may end the share function for the peripheral device depending on a specified condition. For example, when a user input of selecting a share function end button provided at the electronic device is received, when a location of the electronic device is out of a specified region, when control information of a specified unit is completely transmitted, or when a specified time period passes, the electronic device may end a function for sharing the peripheral device.

Figure 12:
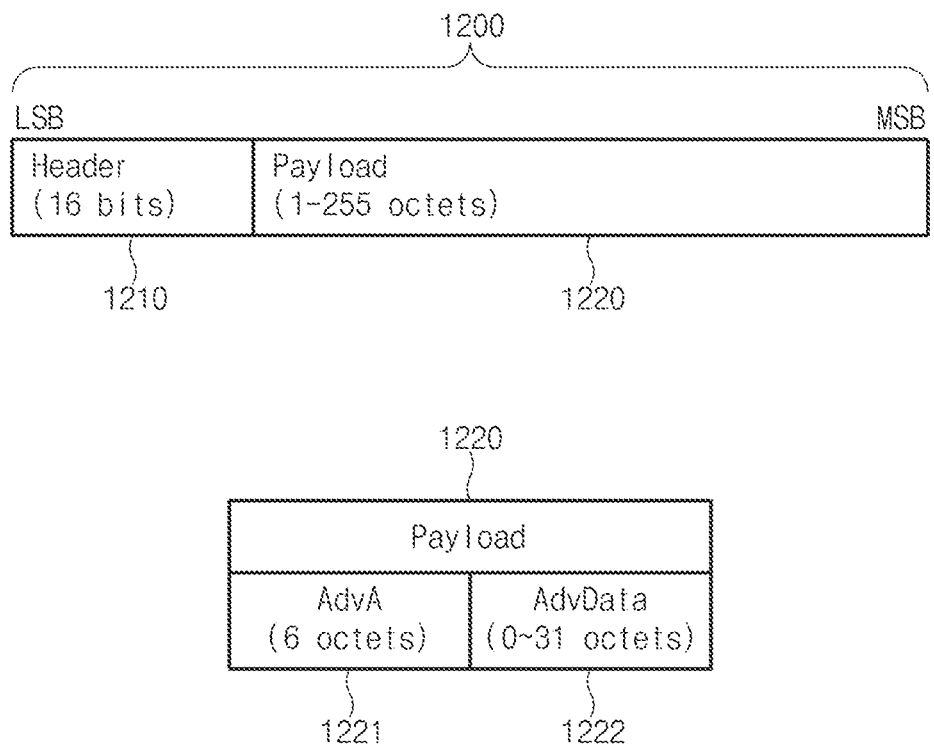
FIG. 12 illustrates a format of a packet data unit of a channel through which an electronic device transmits an advertising packet, according to an embodiment.

FIG. 12 illustrates a format of a packet data unit 1200 of a channel through which an electronic device transmits an advertising packet, according to an embodiment.

Referring to FIG. 12, the packet data unit 1200 of the channel for transmitting the advertising packet may be configured to include a 16-bit header 1210 and a payload 1220 of 1-255 octets. The payload 1220 may be configured to include an advertising address (AdvA) 1221 of 6 octets and advertising data (AdvData) 1222 of 0 to 31 octets. The electronic device may generate a random advertising address in compliance with a standard (e.g., Bluetooth core specification v5.0).

Figure 13:
FIG. 13 illustrates an example of an advertising packet that an electronic device broadcasts, according to an embodiment.

FIG. 13 illustrates an example of an advertising packet that an electronic device broadcasts, according to an embodiment.

Referring to FIG. 13, advertising data (AdvData) 1300 of the advertising packet may be configured to include a first field 1310 including information associated with flag data of the electronic device being an advertising device (or an advertiser) and a second field 1320 including information associated with manufacturer data.

The first field 1310 includes Length 1311 indicating a length of the first field 1310, AD Type 1312 indicating an advertising (AD) type, and flag data 1313. The flag data 1310 may indicate "LE (low energy) General Discoverable Mode" indicating that a scan is possible without limitation, "LE limited Generable Mode" indicating that a scan is possible only during a specific time, "BR/EDR Not Supported" indicating that BR/EDR (basic rate/enhanced data rate) is not supported, "Simultaneous LE and BR/EDR to Same Device Capable (Controller)" indicating that LE and BR/EDR are simultaneously supported at the same device (controller), and "Simultaneous LE and BR/EDR to Same Device Capable (Host)" indicating that LE and BR/EDR are simultaneously supported at the same device (host).

The second field 1320 includes Length 1321 indicating a length of the second field 1320, AD Type 1322 indicating an advertising type, company ID 1323, version information 1324, service ID 1325, and service specific data 1326. The version information 1324, the service ID 1325, and the service specific data 1326 that are data capable of being specified by a manufacturer may be referred to as "manufacturer specific data". For example, the electronic device may define a Wi-Fi Aware service ID at the service ID 1325 and may include information required for a Wi-Fi Aware service in the service ID 1325. The electronic device receiving the advertising packet may verify company ID 1323, version information 1324, service ID 1325, or service specific data 1326 and may identify that a device transmitting the advertising packet is a device supporting the Wi-Fi Aware service.

Figure 14:
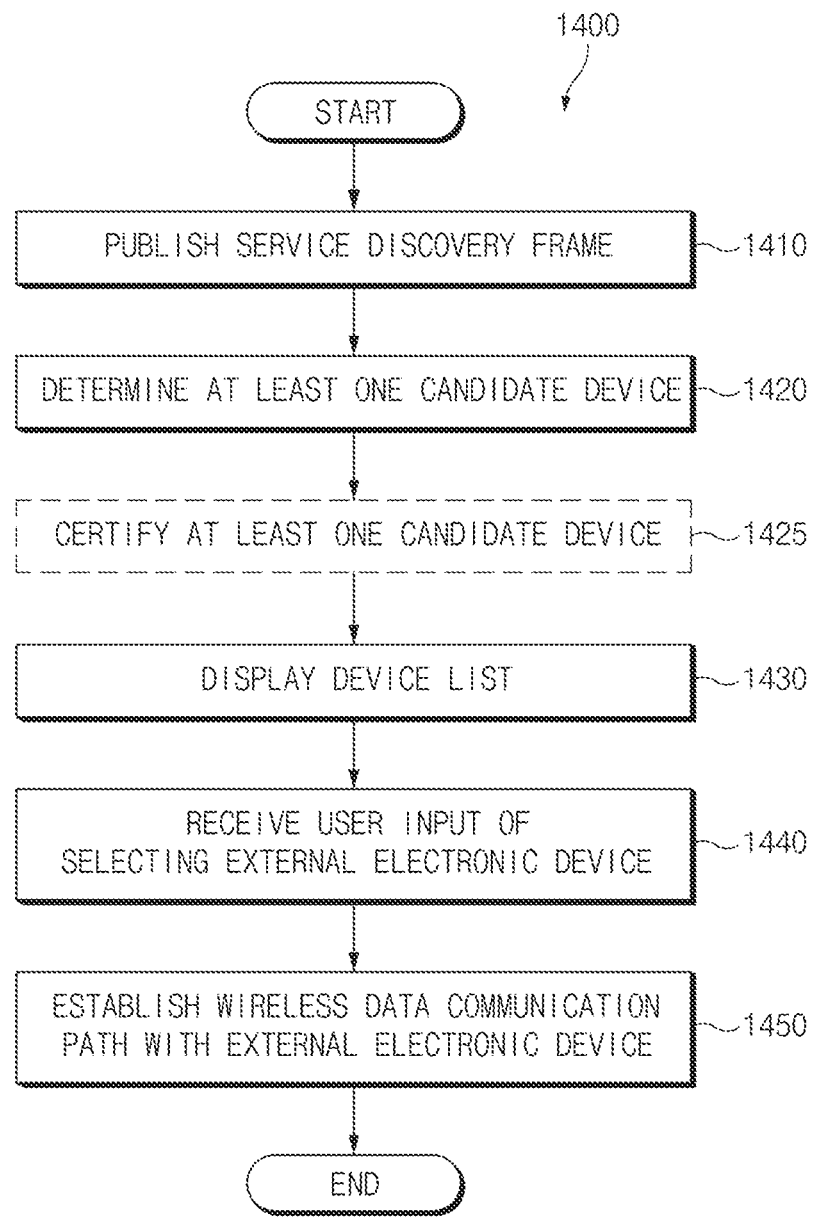
FIG. 14 is a flowchart illustrating a process in which an electronic device establishes a wireless data communication path with an external electronic device, according to an embodiment.

FIG. 14 is a flowchart 1400 illustrating a process (e.g., step 820 of FIG. 8 or step 915 to step 923 of FIG. 9) in which an electronic device establishes a wireless data communication path with an external electronic device, according to an embodiment.

In step 1410, the electronic device publishes a service discovery frame (e.g., a NAN discovery frame) to devices included in a cluster. The expression "publish" the service discovery frame may be understood to mean "transmitting" the service discovery frame. The service discovery frame may include a service name (e.g., a Bluetooth™ share service) of a service providing a function for a peripheral device and matching filter information.

In step 1420, the electronic device determines at least one candidate device subscribing the service discovery frame. For example, when the external electronic device receives the service discovery frame, the external electronic device may verify the service name and the matching filter information included in the service discovery frame. When the service name and the matching filter information are matched with information stored in the external electronic device, the external electronic device may transmit an acknowledgment (ACK) signal for the received service discovery frame. The electronic device may receive the ACK signal and may determine the external electronic device transmitting the ACK signal as a device subscribing the service discovery frame.

In step 1425, the electronic device certifies at least one candidate device. For example, in the case where contact information associated with the at least one candidate device is stored in the electronic device, the electronic device may certify the candidate device. However, step 1425 may also not be executed. For example, in the case where location information of the electronic device indicates that the user is at home, the electronic device may not perform certification on devices placed around the electronic device.

In step 1430, the electronic device displays a device list for the at least one device. In the case where the at least one candidate device is certified in step 1425, the electronic device may display the device list including only a device that is completely certified in step 1430.

In step 1440, the electronic device receives a user input of selecting the external electronic device from candidate devices included in the device list. In step 1450, the electronic device establishes the wireless data communication path with the external electronic device thus selected.

Figure 15:
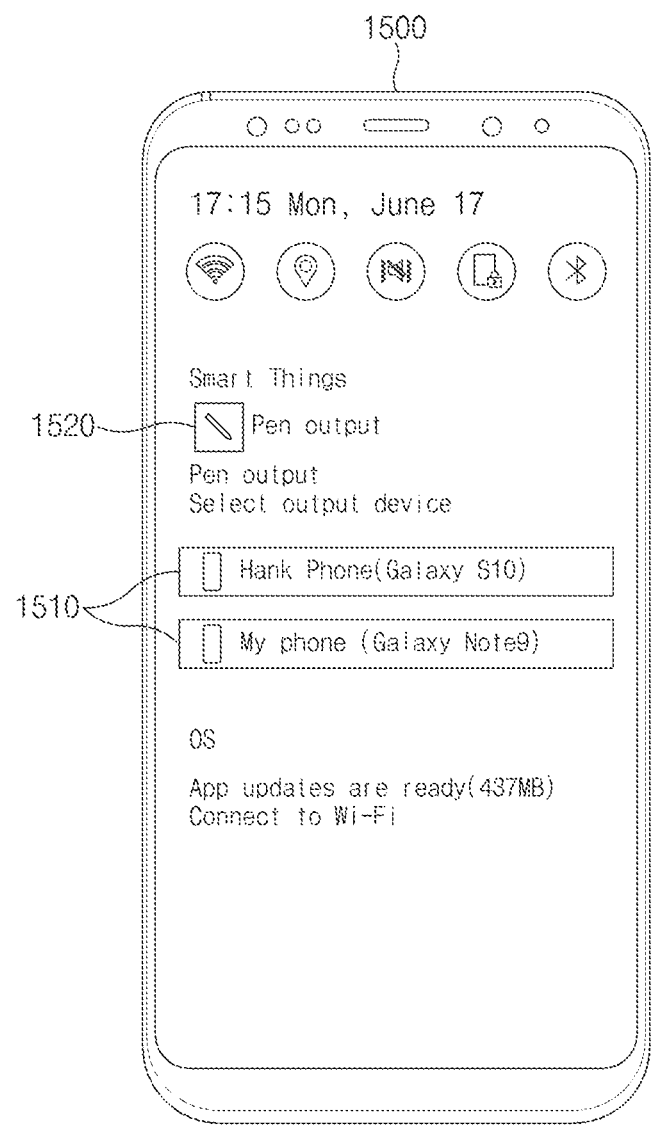
FIG. 15 illustrates an example of a screen including a device list that an electronic device displays, according to an embodiment.

FIG. 15 illustrates an example of a screen including a device list that an electronic device 1500 displays, according to an embodiment.

Referring to FIG. 15, when a function of the electronic device 1500 for sharing a peripheral device is enabled, the electronic device 1500 may display a screen including information 1520 of the peripheral device targeted for sharing.

Also, the electronic device 1500 may display a screen including a device list 1510 including at least one candidate device. The electronic device 1500 may receive a user input (e.g., a touch input through a touch screen) for selecting an external electronic device from devices included in the device list 1510.

Based on the user input, the electronic device 1500 may select only one of the devices included in the device list 1510 or may select a plurality of devices thereof. In this case, the electronic device 1500 may display check boxes on one side (e.g., the left or right) of the device list 1510. The electronic device 1500 may select devices as much as the number of check boxes selected from among the check boxes.

In the case where a plurality of devices (e.g., "Hank Phone" and "My phone") are selected, the plurality of devices may be simultaneously controlled by the peripheral device. For example, based on a user input received through the peripheral device, the plurality of devices may simultaneously photograph images, may photograph images at a specified time interval, or may perform continuous photographing in turn.

Figure 16:
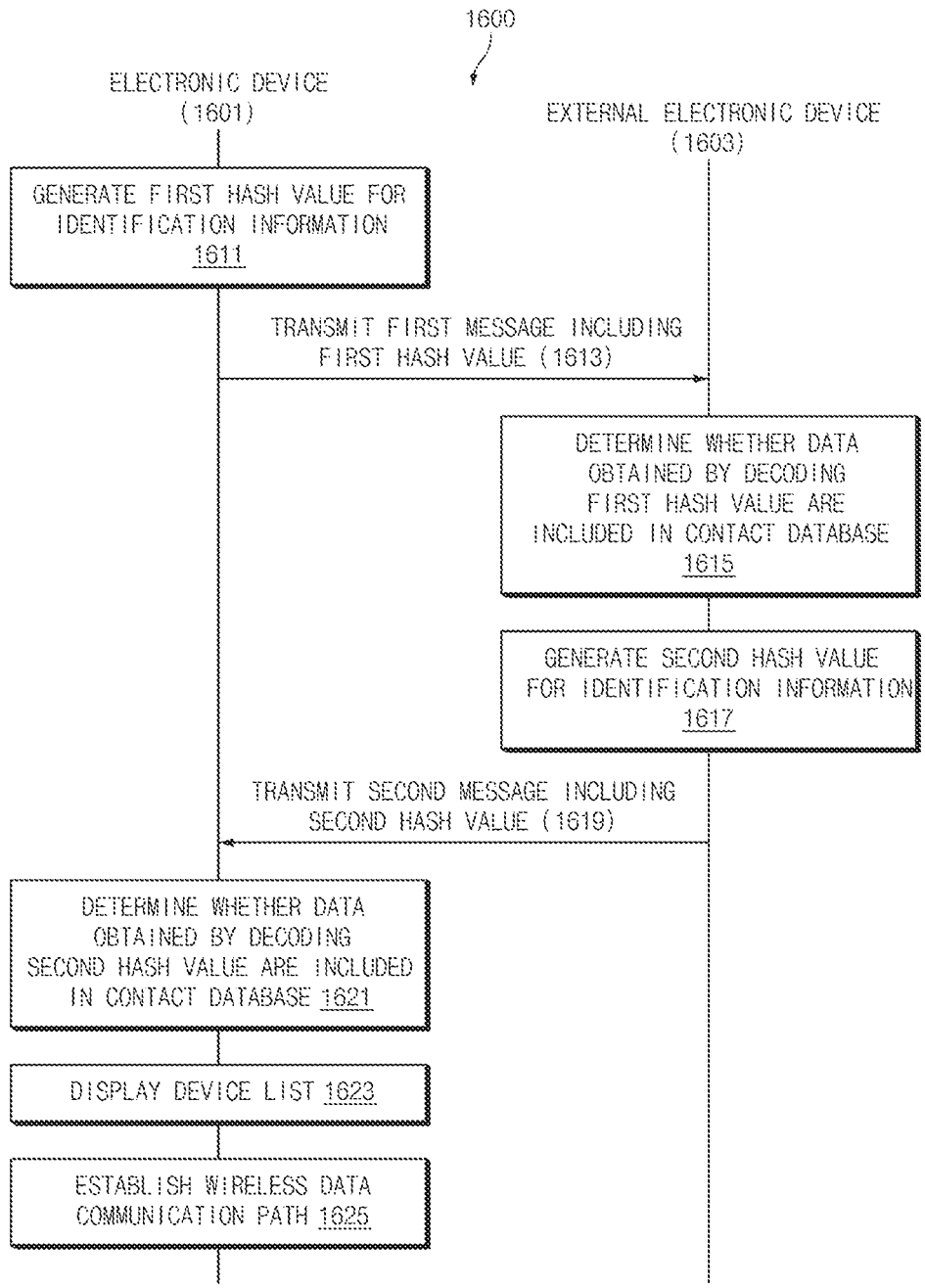
FIG. 16 is a flowchart illustrating a process in which an electronic device and an external electronic device perform mutual certification, according to an embodiment.

FIG. 16 is a flowchart 1600 illustrating a process in which an electronic device 1601 and an external electronic device 1603 perform mutual certification, according to an embodiment.

In step 1611, the electronic device 1601 generates a first hash value for transferring identification information of the electronic device 1601. The identification information of the electronic device 1601 may mean information for identifying an electronic device. For example, the identification information may include contact information, user account information, a user name, a user nick name, a group to which a user belongs, or a social media ID, which is associated with the electronic device 1601.

In step 1613, the electronic device 1601 transmits a first message including the first hash value to the external electronic device 1603. The external electronic device 1603 may decode the first hash value of the received message. In step 1615, the external electronic device 1603 determines whether data obtained by decoding the first message is included in a contact database of the external electronic device 1603. The contact database may be a database that is implemented with contact information registered by the user.

When the data obtained by decoding the first message is included in the contact database of the external electronic device 1603, in step 1617, the external electronic device 1603 generates a second hash value of the identification information of the external electronic device 1603. In step 1619, the external electronic device 1603 transmits a second message including the second hash value to the electronic device 1601.

The electronic device 1601 receiving the second message may decode the second hash value of the received message. In step 1621, the electronic device 1601 determines whether data obtained by decoding the second message is included in the contact database of the electronic device 1601.

When the data obtained by decoding the second message is included in the contact database of the electronic device 1601, in step 1623, the electronic device 1601 displays a device list including information about the external electronic device 1603. The information about the external electronic device 1603 may include identification information about the external electronic device 1603. When the external electronic device 1603 is selected from the device list, in step 1625, the electronic device 1601 establishes a wireless data communication path with the external electronic device 1603.

Figure 17:
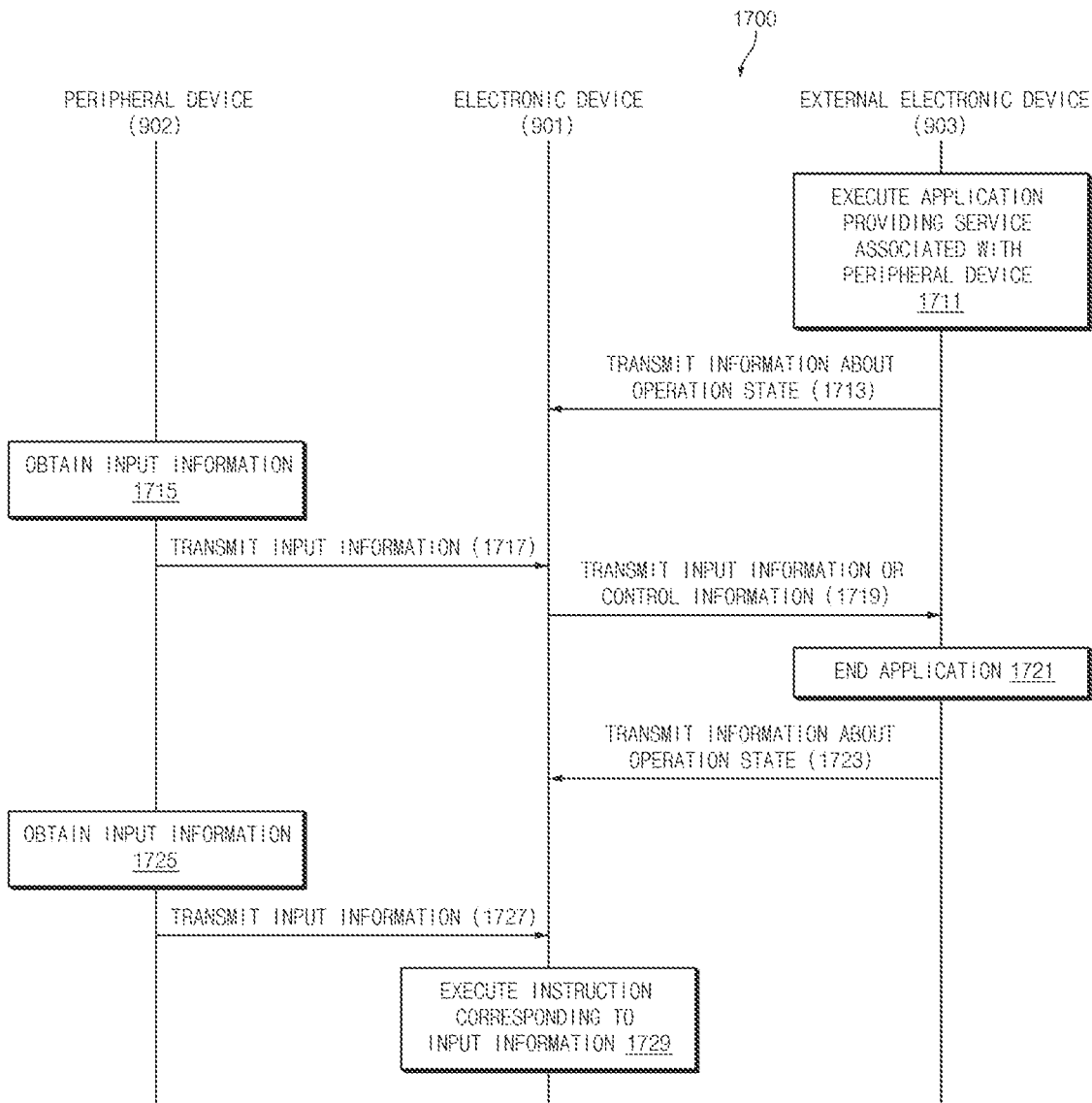
FIG. 17 is a flowchart illustrating a process for sharing a peripheral device based on an operation state of an external electronic device, according to an embodiment.

FIG. 17 is a flowchart 1700 illustrating a process for sharing a peripheral device 902 based on an operation state of the external electronic device 903, according to an embodiment.

The steps illustrated in the flowchart 1700 of FIG. 17 may be performed in a state where a wireless data communication path is established between the electronic device 901 and the external electronic device 903.

In step 1711, the external electronic device 903 executes an application for providing a service associated with the peripheral device 902. For example, the external electronic device 903 may execute a camera application capable of receiving an image photographing command by using the peripheral device 902. In another example, the external electronic device 903 may execute an application capable of providing an air mouse function by using an input received through the peripheral device 902. However, step 1711 may be replaced with any other operation indicating a context associated with an operation of the external electronic device 903. For example, step 1711 may be replaced with a step of changing an operation mode of the external electronic device 903 or a step in which the external electronic device 903 receives a specified user input through an input device of the external electronic device 903.

In step 1713, the external electronic device 903 transmits information about an operation state to the electronic device 901. For example, the external electronic device 903 may transmit, to the electronic device 901, information indicating that a current state is a state where the camera application is executed. In another example, the information about the operation state may be information about an operation mode set to the external electronic device 903. The electronic device 901 receiving the information about the operation state may store the received information about the operation state or may set a flag indicating the operation state of the external electronic device 903. In yet another example, the information about the operation state may be transferred by using the Wi-Fi Aware function.

In step 1715, the peripheral device 902 obtains input information. In step 1717, the peripheral device 902 transmits the obtained input information to the electronic device 901. In step 1719, the electronic device 901 transmits the input information or control information corresponding to the input information to the external electronic device 903 depending on the operation state of the external electronic device 903. For example, in the case where the external electronic device 903 is in a state of executing the camera application, the electronic device 901 may transmit the input information or the control information associated with camera photographing to the external electronic device 903. The external electronic device 903 may execute a function of an application based on the received control information. Additionally or alternatively, the external electronic device 903 may execute an operation of capturing an image by using a camera of the external electronic device 903 as a response to the control information, or may move a location of a cursor on a display as a response to the control information. The operation of the external electronic device 903, which is performed based on the control information, may be variously implemented depending on embodiments.

In step 1721, the external electronic device 903 ends the application providing the service associated with the peripheral device 902. The external electronic device 903 may transmit, to the electronic device 901, information about an operation state indicating that the application providing the service associated with the peripheral device 902 ends. After step 1723, the peripheral device 902 obtains input information in step 1725. In step 1727, the peripheral device 902 transmits the input information obtained in step 1725 to the electronic device 901. In step 1729, the electronic device 901 executes instructions that cause a function of the electronic device 901 to be performed without transmitting the input information received from the peripheral device 902 to the external electronic device 903. Additionally, when a function of sharing input information of the peripheral device 902 with the external electronic device 903 ends, the electronic device 901 may execute instructions that cause the function of the electronic device 901 to be performed without transmitting the input information to the external electronic device 903. For example, in the case where the communication is not made due to the disconnection of the wireless communication path between the electronic device 901 and the external electronic device 903, the electronic device 901 may execute instructions that cause the function of the electronic device 901 to be performed without transmitting the input information to the external electronic device 903.

Figure 18:
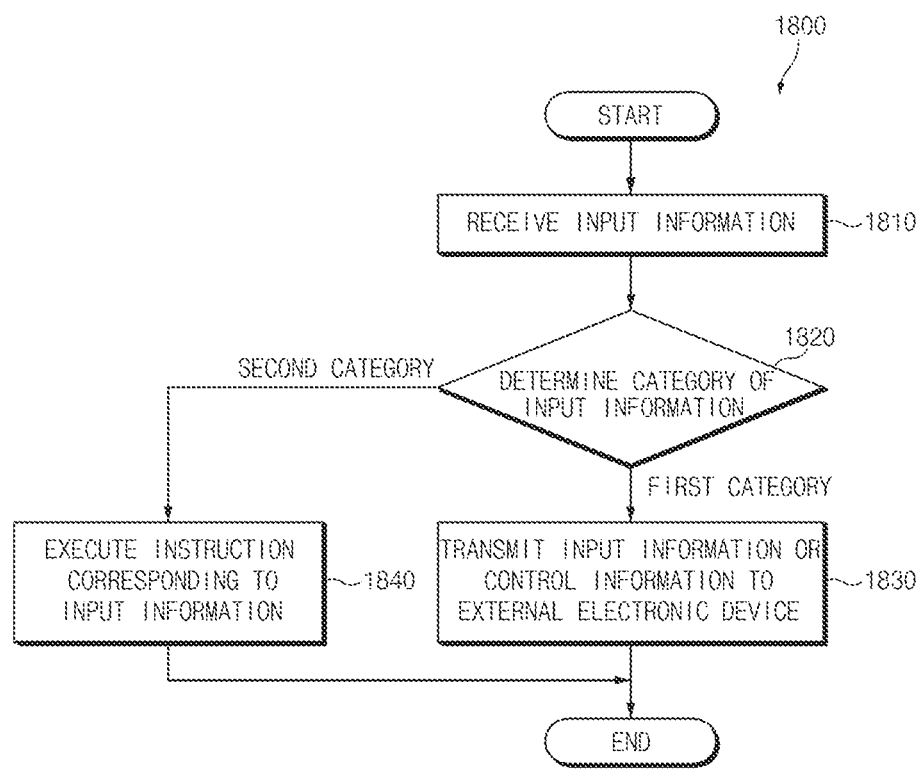
FIG. 18 is a flowchart illustrating a process in which an electronic device processes input information received from a peripheral device based on a category to which the input information belongs, according to an embodiment.

FIG. 18 is a flowchart 1800 illustrating a process in which an electronic device processes input information received from a peripheral device based on a category to which the input information belongs, according to an embodiment.

In step 1810, the electronic device receives input information from the peripheral device through short-range wireless communication. In step 1820, the electronic device determines a category to which the received input information belongs. The category may mean a reference for classifying input information. For example, the electronic device may determine whether the input information is a command for controlling any service.

When the input information belongs to a first category, in step 1830, the electronic device transmits the input information or control information corresponding to the input information to the external electronic device through a wireless data communication path; when the input information belongs to a second category, in step 1840, the electronic device executes instructions for an operation corresponding to the input information or the control information without transmitting the input information or the control information. For example, assuming that the electronic device is a smartphone executing a camera application and the external electronic device is a television outputting an image, in the case where the input information is information belonging to a category permitting an image being output to be changed, the smartphone may transmit, to the television, control information that allows the television to change the displayed image. In contrast, in the case where the input information is information belonging to a category permitting an image to be photographed, the smartphone may perform an operation of photographing an image without transmitting the control information to the television.

Figure 19:
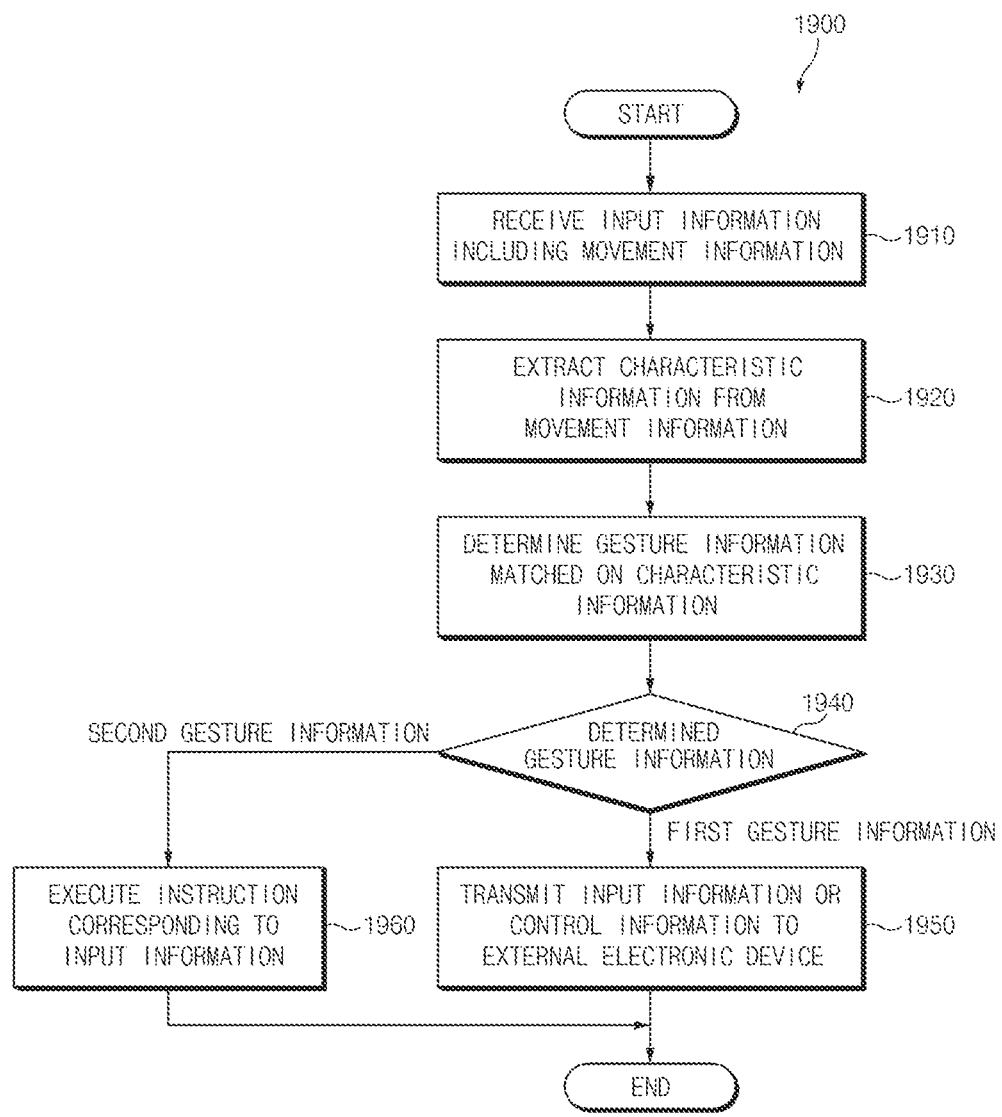
FIG. 19 is a flowchart illustrating how to process a gesture input using a peripheral device, according to an embodiment.

FIG. 19 is a flowchart 1900 illustrating how to process a gesture input using a peripheral device, according to an embodiment.

In step 1910, an electronic device receives input information including movement information from the peripheral device. In step 1920, the electronic device extracts characteristic information from the received input information.

In step 1930, the electronic device determines gesture information matched with the characteristic information. For example, the electronic device may store characteristic information defining a plurality of characteristics and gesture information associated with each characteristic in a memory 130 of the electronic device. The electronic device may calculate the similarities between the characteristic information extracted from the input information and characteristics included in reference characteristic information to select a characteristic of the highest similarity. The electronic device may determine gesture information associated with the selected characteristic as gesture information matched with the characteristic information.

In step 1940, the electronic device determines an operation to be performed, based on the determined gesture information. When the determined gesture information is first gesture information, in step 1950, the electronic device transmits input information or control information corresponding to the input information to the external electronic device. When the determined gesture information is second gesture information, in step 1960, the electronic device executes an instruction corresponding to the input information. When the input information is gesture information of a vertical direction, the electronic device transmits the input information or the control information to the external electronic device so as to photograph an image. In contrast, when the input information is gesture information of a horizontal direction, the electronic device may execute instructions for switching a screen displayed at the electronic device.

The electronic device may determine an operation to be performed, based on a direction of the gesture information. For example, in the case where the gesture information indicates that a gesture starts from a location where the electronic device is placed, moves toward a location where the external electronic device is placed, and ends, the electronic device may transmit the control information to the external electronic device. In contrast, in the case where the gesture information indicates that a gesture moves toward a location where the electronic device is placed and then ends, the electronic device may perform a function corresponding to the input information received from the peripheral device. In another example, the electronic device may classify a gesture based on additional input information. In detail, the electronic device may determine first gesture information input in a state where a button 337 of the peripheral device is pressed and second gesture information input in a state where the button 337 is not pressed, as different gesture information. For example, the electronic device may transmit the control information to the external electronic device only with regard to information of a gesture performed in a state where the button 337 is pressed.

Figure 20:
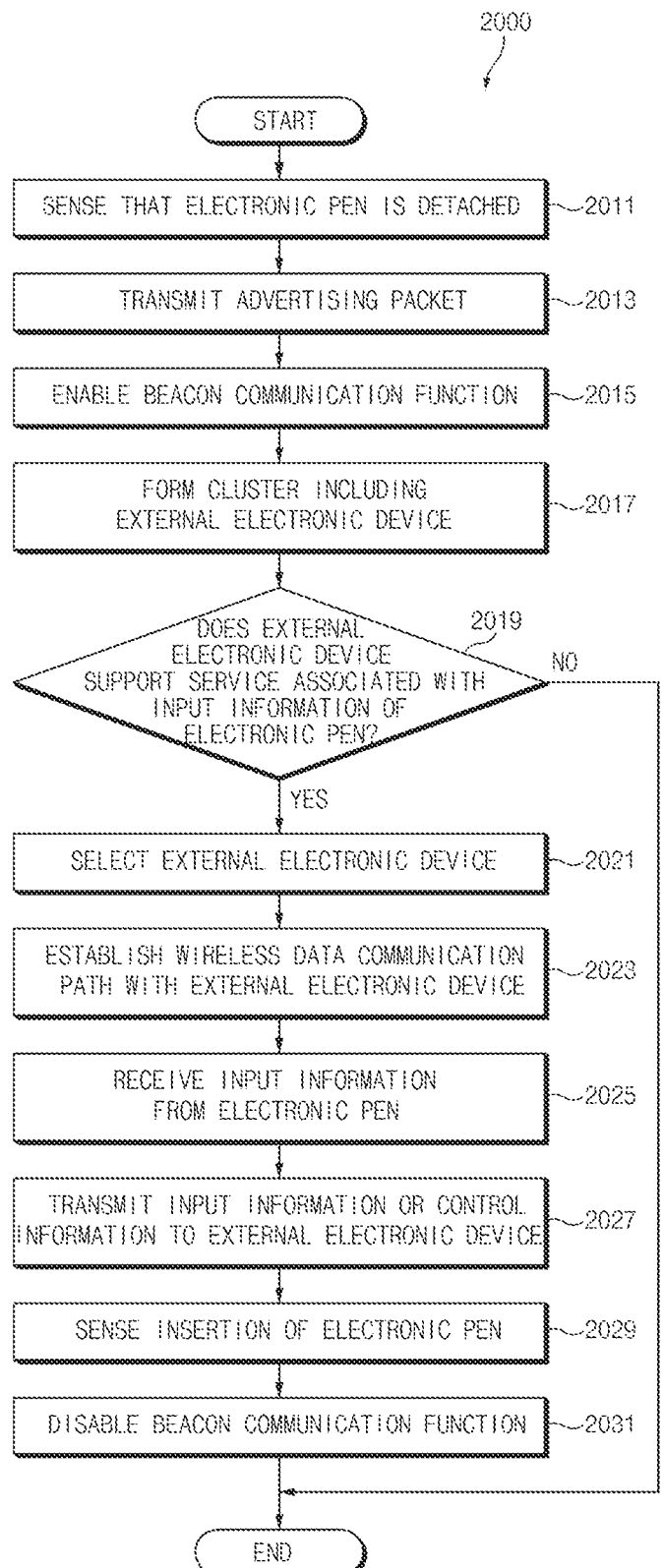
FIG. 20 is a flowchart illustrating a process in which a peripheral device, being an electronic pen, is shared by an external electronic device under the control of an electronic device, according to an embodiment.

FIG. 20 is a flowchart 2000 illustrating a process in which an electronic pen acting as a peripheral device is shared by an external electronic device under the control of an electronic device, according to an embodiment.

In step 2011, the electronic device senses that the electronic pen is detached from a coupling structure of the electronic device. When it is sensed that the electronic pen is detached, in step 2013, the electronic device transmits the advertising packet for allowing the external electronic device to enable a beacon communication function, to the surroundings of the electronic device.

In step 2015, the electronic device enables the beacon communication function (e.g., a Wi-Fi Aware function) for the purpose of performing communication with the external electronic device and forming a cluster. In step 2017, the electronic device forms the cluster including the external electronic device by using the beacon communication function.

In step 2019, the electronic device determines whether at least one external electronic device supports a service associated with input information of the electronic pen. For example, the electronic device may receive information including an identifier of the service, which the external electronic device supports, from the at least one external electronic device and may determine whether to support the service.

When it is determined that the at least one external electronic device supports the service associated with the input information of the electronic pen, in step 2021, the electronic device selects an external electronic device in the cluster. In step 2023, the electronic device establishes a wireless data communication path with the external electronic device thus selected.

In step 2025, the electronic device receives input information from the electronic pen. In step 2027, the electronic device transmits the input information received from the electronic pen or control information corresponding to the input information to the external electronic device.

The electronic device establishes the wireless data communication path with a plurality of external electronic devices in step 2023 and transmits the control information to the plurality of external electronic devices in step 2027. That is, the plurality of external electronic devices may be controlled based on input information received from one peripheral device. Also, the electronic device may transmit the control information to the external electronic device and may execute instructions corresponding to the input information. That is, the external electronic device and the electronic circuit may be controlled together based on a piece of input information.

In step 2029, the electronic device senses that the electronic pen is inserted into the electronic device. In step 2031, the electronic device disables the beacon communication function. Additionally, the electronic device may receive an input about disabling a pen share function through a user interface displayed at the electronic device and may disable the beacon communication function.

Figure 21:
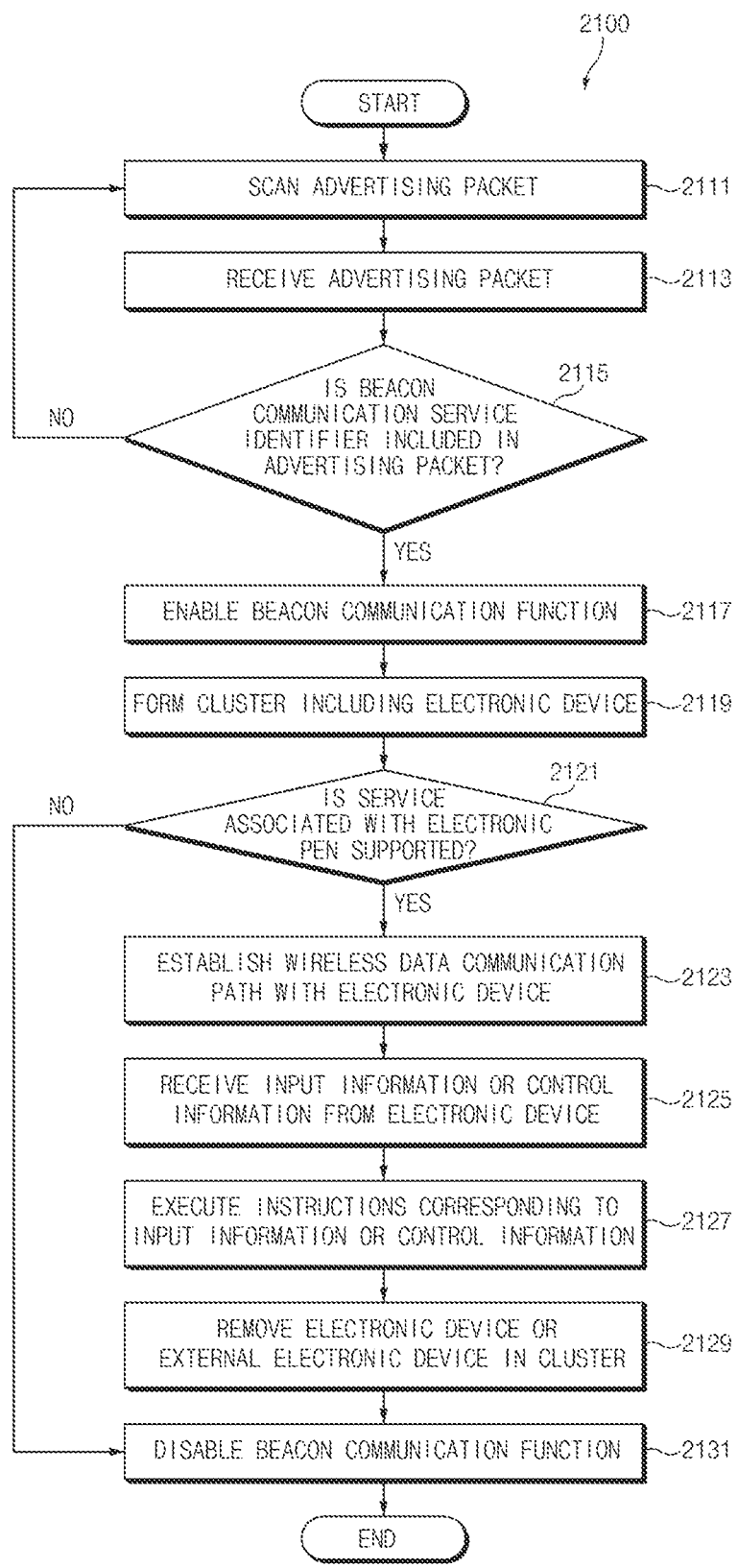
FIG. 21 is a flowchart illustrating a process in which an electronic pen, being a peripheral device, is shared by an external electronic device under the control of an electronic device, according to an embodiment.

FIG. 21 is a flowchart 2100 illustrating a process in which an electronic pen acting as a peripheral device is shared by an external electronic device under the control of an electronic device, according to an embodiment.

To receive the advertising packet transmitted by the electronic device, in step 2111, the external electronic device scans the advertising packet.

In step 2113, the external electronic device receives the advertising packet from the electronic device. In step 2115, the external electronic device determines whether a beacon communication service ID is included in the received advertising packet. When it is determined that the beacon communication service ID is not included in the received advertising packet, in step 2115, the external electronic device ignores the received advertising packet. When it is determined that the beacon communication service ID is included in the received advertising packet, in step 2117, the external electronic device enables a beacon communication function (e.g., a Wi-Fi Aware function). In step 2119, the external electronic device forms a cluster with surrounding devices in which the beacon communication function is enabled.

In step 2121, the external electronic device determines whether the electronic device transmitting the advertising packet supports a service associated with the electronic pen. When it is determined that the electronic device supports the service associated with the electronic pen, in step 2123, the external electronic device establishes a wireless data communication path between the electronic device and the external electronic device. When it is determined that the electronic device does not support the service associated with the electronic pen, in step 2131, the external electronic device disables the beacon communication function.

In step 2125, the external electronic device receives input information or control information from the electronic device through the wireless data communication path. In step 2127, the external electronic device executes instructions corresponding to the received input information or control information.

In step 2129, the electronic device or the external electronic device is released from the cluster. For example, a distance between the external electronic device and the electronic device may increase, or the electronic device may disable the beacon communication function. In step 2131, the external electronic device disables the beacon communication function.

Figure 22:
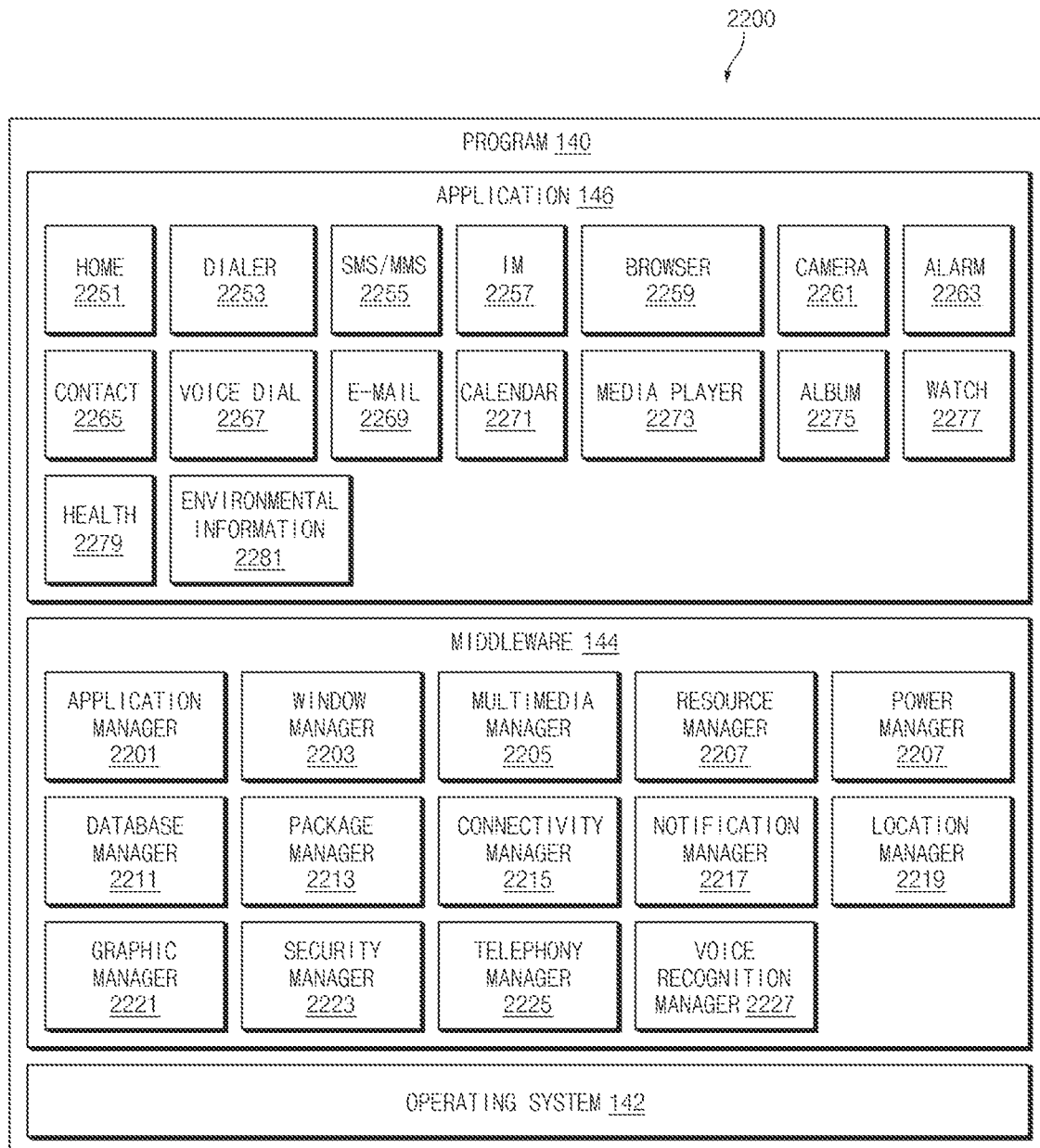
FIG. 22 is a block diagram illustrating a program, according to an embodiment.

FIG. 22 is a block diagram illustrating a program, according to an embodiment.

FIG. 22 is a block diagram 2200 illustrating the program 140, according to an embodiment. The program 140 may include the operating system 142 for controlling one or more resources of the electronic device 101, the middleware 144, or the application 146 executable in the operating system 142. The operating system 142 may include, for example, Android™, iOS™, Windows™, Symbian™, Tizen™, or Bada™. At least a part of the program 140 may be preloaded on the electronic device 101 when the electronic device 101 is manufactured. Alternatively, when the electronic device 101 is used by the user, at least a part of the program 140 may be downloaded from an external electronic device or may be updated.

The operating system 142 may control the management (e.g., allocating or retrieving) of one or more system resources (e.g., a processor, a memory, or a power component) of the electronic device 101. Additionally or alternatively, the operating system 142 may include one or more driver programs for driving any other hardware device of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 is capable of being used by the application 146. The middleware 144 may include, for example, an application manager 2201, a window manager 2203, a multimedia manager 2205, a resource manager 2207, a power manager 2209, a database manager 2211, a package manager 2213, a connectivity manager 2215, a notification manager 2217, a location manager 2219, a graphic manager 2221, a security manager 2223, a telephony manager 2225, or a voice recognition manager 2227.

The application manager 2201 may manage a life cycle of the application 146. The window manager 2203 may manage one or more GUI resources that are used in a screen. The multimedia manager 2205 may seize one or more formats necessary to play media files and may perform encoding or decoding of the corresponding media file among the media files by using a codec appropriate for the corresponding format selected from the formats. The resource manager 2207 may manage a source code of the application 146 or a storage space of the memory 130. The power manager 2209 may manage a capacity, a temperature, or a power of the battery 189 and may determine or provide relevant information necessary for an operation of the electronic device 101 by using information associated with the capacity, the temperature, or the power. The power manager 2209 may operate in conjunction with a basic input/output system (BIOS) of the electronic device 101.

The database manager 2211 may generate, search, or modify a database to be used by the application 146. The package manager 2213 may install or update an application that is distributed in the form of a package file. The connectivity manager 2215 may manage the wireless connection or direct connection between the electronic device 101 and an external electronic device. The notification manager 2217 may provide a function for notify the user that a specified event (e.g., an incoming call, a message, or a notification) occurs. The location manager 2219 may manage location information of the electronic device 101. The graphic manager 2221 may manage one or more graphic effects to be provided to the user or one or more user interfaces associated with the one or more graphic effects.

The security manager 2223 may provide system security or user authentication. The telephony manager 2225 may manage a voice call function or a video call function that is provided by the electronic device 101. The voice recognition manager 2227 may transmit voice data of the user to the server 108, and may receive a command, which corresponds to a function to be performed in the electronic device 101 based at least partially on the voice data, or character data, which are converted based at least partially on the voice data, from the server 108. The middleware 144 may remove a part of existing components dynamically or may add new components. At least a portion of the middleware 144 may be included as a portion of the operating system 142 or may be implemented with separate software different from the operating system 142.

The application 146 may include a home application 2251, a dialer application 2253, a short message service (SMS)/multimedia message service (MMS) application 2255, an instant message (IM) application 2257, a browser application 2259, a camera application 2261, an alarm application 2263, a contact application 2265, a voice recognition application 2267, an e-mail application 2269, a calendar application 2271, a media player application 2273, an album application 2275, a watch application 2277, a health application 2279, or an environment information application 2281 (e.g., an application measuring atmospheric pressure, humidity, or temperature information).

The application 146 may further include an information exchanging application that is capable of supporting information exchange between the electronic device 101 and an external electronic device. The information exchanging application may include a notification relay application configured to transmit specified information (e.g., a call, a message, or a notification) to the external electronic device or a device management application configured to manage the external electronic device. The notification relay application may transmit notification information corresponding to a specified event (e.g., an event that mail is received) occurring in another application (e.g., the e-mail application

2269) of the electronic device 101 to the external electronic device. Additionally or alternatively, the notification relay application may receive notification information from the external electronic device and may provide the received notification information to the user of the electronic device 101.

The device management application may control a power function (e.g., turn-on function or turn-off function) or another function (e.g., a brightness function, a resolution function, or a focus of the display device 160 or the camera module 180 function) of the external electronic device communicating with the electronic device 101 or some components (e.g., the display device 160 or the camera module 180) thereof. Additionally or alternatively, the device management application may support the installation, deletion, or update of an application that operates in the external electronic device.

According to an embodiment, an electronic device may include a short-range wireless communication circuit that performs first short-range wireless communication based on a first protocol and second short-range wireless communication based on a second protocol, and a processor that is operatively connected with the short-range wireless communication circuit. The processor may connect the first short-range wireless communication with a peripheral device through the short-range wireless communication circuit, may transmit a service discovery frame including service information associated with the peripheral device to devices included in a cluster configured to include the electronic device through the second short-range wireless communication, when a trigger event occurs, may establish a wireless data communication path with an external electronic device, which transmits a message in response to the service discovery frame to the electronic device through the second short-range wireless communication, from among the devices included in the cluster, and may transmit input information received from the peripheral device through the short-range wireless communication circuit or control information corresponding to the input information to the external electronic device through the wireless data communication path.

The electronic device may include a coupling structure in which the peripheral device is capable of being mounted, and the trigger event may include at least one of a first event indicating that the trigger event is sensed by using a sensor provided in the coupling structure indicating that the peripheral device is detached from the coupling structure, a second event indicating that a user input of executing a command allowing data to be transmitted to the outside is received, or a third event indicating that the electronic device is within a specified region.

The processor may control the short-range wireless communication circuit so as to broadcast an advertising packet including identification information of the electronic device, when the trigger event occurs, and may receive a sync beacon packet in response to the advertising packet to form the cluster with respect to devices transmitting the sync beacon packet.

The service discovery frame may include a service name indicating a service associated with the peripheral device and matching filter information.

The electronic device may further include a display device, and the processor may determine at least one candidate device transmitting the message in response to the service discovery frame to the electronic device, may control the display device so as to display a device list for the at least one candidate device, may receive a user input to the device list, and may select the external electronic device, with which the wireless data communication path is to be established, based on the user input.

The processor may receive information about an operation state of the external electronic device from the external electronic device and may determine whether to transmit the input information or the control information, based on the information about the operation state.

The information about the operation state may include information about whether the external electronic device is executing an application providing a service associated with the peripheral device.

The processor may determine a category, to which the input information belongs, from among input classification categories set to the electronic device and may determine whether to transmit the input information or the control information, based on the determined category.

The processor may transmit the input information or the control information to the external electronic device through the wireless data communication path when the determined category is a first category and may execute instructions corresponding to the input information when the determined category is a second category.

The input information may include movement information obtained by sensing a physical movement of the peripheral device, and the processor may extract characteristic information from the movement information, may determine gesture information matched with the characteristic information, may transmit the input information or the control information to the external electronic device through the wireless data communication path when the determined gesture information is first gesture information, and may execute instructions corresponding to the input information when the determined gesture information is second gesture information.

The electronic device may further include a memory that is operatively connected with the processor and stores identification information of a device registered as a device certified by the electronic device, and a display device that is operatively connected with the processor, and the processor may transmit, to the external electronic device, a first message in which a first hash value of user identification information about a user of the electronic device is included, may obtain a second hash value of identification information of the external electronic device from a second message received from the external electronic device in response to the first message, may determine whether the identification information of the external electronic device is stored in the memory, based on the second hash value, may control the display device to display a device list including an item indicating at least a portion of the identification information of the external electronic device when the identification information is stored in the memory, and may establish the wireless data communication path in response to a user input of selecting the item.

The peripheral device may include an electronic pen that transmits the input information to the electronic device through the short-range wireless communication circuit.

The first protocol may be a Bluetooth low energy communication protocol, and the second protocol may be a Wi-Fi Aware communication protocol.

According to an embodiment, a method in which an electronic device shares a peripheral device may include performing (i.e., connecting using) first short-range wireless communication based on a first protocol with the peripheral device, sensing an occurrence of a trigger event, transmitting a service discovery frame including service information associated with the peripheral device to devices included in a cluster configured to include the electronic device through second short-range wireless communication, in response to the trigger event, establishing a wireless data communication path with an external electronic device, which transmits a message in response to the service discovery frame to the electronic device through the second short-range wireless communication, from among the devices included in the cluster, and transmitting input information received from the peripheral device or control information corresponding to the input information to the external electronic device through the wireless data communication path.

The sensing of the occurrence of the trigger event may include sensing that the peripheral device is detached from the electronic device, receiving a user input of executing a command allowing data to be transmitted outside the electronic device, or sensing that the electronic device is within a specified region.

The method may further include broadcasting an advertising packet including identification information of the electronic device when the trigger event occurs, and receiving a sync beacon packet in response to the advertising packet to form the cluster with respect to devices transmitting the sync beacon packet.

The service discovery frame may include a service name indicating a service associated with the peripheral device and matching filter information.

Establishing the wireless data communication path may further include determining at least one candidate device subscribing to the service discovery frame, controlling a display device of the electronic device so as to display a device list for the at least one candidate device, receiving a user input to the device list, and selecting the external electronic device, with which the wireless data communication path is to be established, based on the user input.

Determining the at least one candidate device may further include transmitting, to the external electronic device, a first message in which a first hash value of user identification information about a user of the electronic device is included, obtaining a second hash value of identification information of the external electronic device from a second message received from the external electronic device in response to the first message, determining whether the identification information of the external electronic device is stored in a memory of the electronic device, based on the second hash value, and determining that the external electronic device is included in the at least one candidate device, when it is determined that a second hash value of the identification information of the external electronic device is stored in the memory.

According to an embodiment, an electronic device may include a short-range wireless communication circuit that performs first short-range wireless communication based on a first protocol and second short-range wireless communication based on a second protocol, and a processor that is connected with the short-range wireless communication circuit, and the processor may receive an advertising packet from an external electronic device through the first short-range wireless communication, may determine whether the advertising packet includes a communication service identifier identifying a communication service performed based on the second short-range wireless communication, may enable a function of the communication service when the advertising packet includes the communication service identifier, may form a cluster with the external electronic device based on the second short-range wireless communication, may establish a wireless data communication path with the external electronic device, may receive input information that was received from a peripheral device communicatively connected with the external electronic device from the external electronic device through the wireless data communication path or control information corresponding to the input information, and may execute instructions corresponding to the received input information or the control information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, a method and a device capable of easily sharing a peripheral device of an electronic device with an external electronic device may be provided.

According to various embodiments of the disclosure, a method and a device capable of easily selecting a surrounding external electronic device associated with a user of an electronic device and sharing a peripheral device may be provided.

According to various embodiments of the disclosure, a new user experience using a peripheral device together with a plurality of devices may be provided to a user.

Additional advantageous effects may be realized directly or indirectly through this disclosure.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
a display screen;
at least one wireless communication circuit;
a memory storing instructions; and
at least one processor,
wherein the instructions, when executed by the at least one processor, cause the electronic device to:
receive a user input from a peripheral device through a first connection between the electronic device and the peripheral device,
transmit a request associated with a share function for the peripheral device to at least one external electronic device near the electronic device,
receive a response to the request from the at least one external electronic device,
determine whether the at least one external electronic device is registered to a same user account as the electronic device,
determine whether the share function for the peripheral device is allowed at the at least one external electronic device, and
in case that the at least one external electronic device is registered to the same user account as the electronic device and the share function for the peripheral device is allowed at the at least one external electronic device, and based on a determination that the user input corresponds to a location of a cursor being out of the display screen, transmit input information associated with the user input from the peripheral device to the at least one external electronic device through a second connection between the electronic device and the at least one external electronic device such that the cursor is caused to be displayed at the at least one external electronic device based on the transmitted input information.

2. The electronic device of claim 1, wherein the share function includes a function for moving a location of the cursor displayed at the at least one external device based on the user input received from the peripheral device.

3. An electronic device, comprising:
a display screen;
at least one wireless communication circuit;
a memory storing instructions; and
at least one processor,
wherein the instructions, when executed by the at least one processor, cause the electronic device to:
receive a first user input from a peripheral device through a first connection between the electronic device and the peripheral device,
transmit a request associated with a share function for the peripheral device to at least one external electronic device near the electronic device,
receive a response to the request from the at least one external electronic device which is registered to a same user account as the electronic device and allows the share function,
based on a determination that the first user input from the peripheral device corresponds to a location of a cursor being out of the display screen, transmit input information associated with the first user input to the at least one external electronic device, which is registered to the same user account as the electronic device and allows the share function, through a second connection between the electronic device and the at least one external electronic device such that the cursor is caused to be displayed at the at least one external electronic device based on the transmitted input information.

4. The electronic device of claim 3, wherein the first connection and the second connection use different communication protocols.

5. The electronic device of claim 3, wherein the instructions, when executed by the at least one processor, further cause the electronic device to:
activate the share function based on a second user input for selecting a menu associated with the share function displayed on the display screen.

6. The electronic device of claim 3, wherein the instructions, when executed by the at least one processor, further cause the electronic device to:
receive a second user input for selecting an external electronic device from among the at least one external electronic device, and
transmit the input information associated with the second user input from the peripheral device to the selected external electronic device through the second connection.

7. The electronic device of claim 3, wherein the instructions, when executed by the at least one processor, further cause the electronic device to:
when the first user input corresponds to a specified function of the at least one external electronic device, transmit control information for performing the specified function to the at least one external device.

8. The electronic device of claim 3, wherein the instructions, when executed by the at least one processor, further cause the electronic device to:
when a second user input for terminating the share function is received or when a location of the electronic device is out of a specified region, terminate the share function.

9. The electronic device of claim 3, wherein the instructions, when executed by the at least one processor, further cause the electronic device to:
based on a determination that the first user input corresponds to a position of the cursor within the display screen, perform an operation corresponding to the first user input.

10. A method of an electronic device, comprising:
receiving a first user input from a peripheral device through a first connection between the electronic device and the peripheral device;
transmitting a request associated with a share function for the peripheral device to at least one external electronic device near the electronic device;
receiving a response to the request from the at least one external electronic device which is registered to a same user account as the electronic device and allows the share function;
based on a determination that the first user input corresponds to a location of a cursor being out of a display screen of the electronic device, transmitting input information associated with the first user input from the peripheral device to the at least one external electronic device, which is registered to the same user account as the electronic device and allows the share function, through a second connection between the electronic device and the at least one external electronic device such that the cursor is caused to be displayed at the at least one external electronic device based on the transmitted input information.

11. The method of claim 10, wherein the first connection and the second connection use different communication protocols.

12. The method of claim 10, wherein the share function includes a function for moving a location of the cursor displayed at the at least one external device based on the first user input received from the peripheral device.

13. The method of claim 10, further comprising:
activating the share function based on a second user input for selecting a menu associated with the share function displayed on the display screen.

14. The method of claim 10, further comprising:
receiving a second user input for selecting an external electronic device from among the at least one external electronic device; and
transmitting the input information associated with the second user input from the peripheral device to the selected external electronic device through the second connection.

15. The method of claim 10, further comprising:
outputting information associated with at least one external electronic device connected to the electronic device or information indicating that the first user input from the peripheral device is shared by the external electronic device.

16. The method of claim 10, further comprising:
when the first user input corresponds to a specified function of the at least one external electronic device, transmitting control information for performing the specified function to the at least one external device.

17. The method of claim 10, further comprising:
when a second user input for terminating the share function is received or when a location of the electronic device is out of a specified region, terminating the share function.

18. The method of claim 10, further comprising:
performing an operation of the electronic device corresponding to the first user input along with transmitting the input information such that the electronic device and the at least one electronic device are controlled together based on the first user input.

19. The method of claim 10, further comprising:
based on a determination that the first user input corresponds to a position of the cursor within the display screen, performing an operation corresponding to the first user input.

20. A non-transitory computer-readable storage medium having stored thereon instructions that, when executed by the at least one processor of an electronic device, cause the electronic device to:
receive a user input from a peripheral device through a first connection between the electronic device and the peripheral device,
transmit a request associated with a share function for the peripheral device to at least one external electronic device near the electronic device,
receive a response to the request from the at least one external electronic device which is registered to a same user account as the electronic device and allows the share function,
based on a determination that the user input corresponds to a location of a cursor being out of a display screen of the electronic device, transmit input information associated with the user input from the peripheral device to the at least one external electronic device, which is registered to the same user account as the electronic device and allows the share function, through a second connection between the electronic device and the at least one external electronic device such that the cursor is caused to be displayed at the at least one external electronic device based on the transmitted input information.

* * * * *